United States Patent [19]

Taroda et al.

[11] Patent Number: 5,862,363
[45] Date of Patent: Jan. 19, 1999

[54] METHOD OF CONTROLLING A DISK DEVICE BY DISK CONTROL UNIT

[75] Inventors: Yuichi Taroda; Keishichiro Tanaka; Kazuma Takatsu, all of Kawasaki, Japan

[73] Assignee: Fujitsu Limited, Kawasaki, Japan

[21] Appl. No.: 568,131

[22] Filed: Dec. 6, 1995

[51] Int. Cl.[6] .................................................. G06F 7/22
[52] U.S. Cl. ....................................... 395/500; 395/183.05
[58] Field of Search ................................ 395/500, 183.05

[56] References Cited

U.S. PATENT DOCUMENTS

| | | | |
|---|---|---|---|
| 5,206,939 | 4/1993 | Yanai et al. | 395/400 |
| 5,283,884 | 2/1994 | Menon et al. | 395/425 |
| 5,301,304 | 4/1994 | Menon | 395/500 |
| 5,388,013 | 2/1995 | Nakamura | 360/48 |
| 5,421,003 | 5/1995 | Escola et al. | 395/575 |
| 5,497,472 | 3/1996 | Yamamoto et al. | 395/427 |
| 5,530,829 | 6/1996 | Beardsley et al. | 395/440 |
| 5,535,372 | 7/1996 | Benhase et al. | 395/500 |
| 5,553,307 | 9/1996 | Fujii et al. | 395/845 |
| 5,557,767 | 9/1996 | Sakegawa | 395/440 |
| 5,568,628 | 10/1996 | Satoh et al. | 395/440 |
| 5,590,298 | 12/1996 | Kawamoto | 395/403 |

FOREIGN PATENT DOCUMENTS 5307440  11/1993  Japan.

*Primary Examiner*—Vincent N. Trans
*Assistant Examiner*—Dan Fiul
*Attorney, Agent, or Firm*—Greer, Burns & Crain, Ltd.

[57] ABSTRACT

One CKD track on a direct-access storage device is divided into a plurality of fixed-length FBA blocks, only a home address HA of the CKD track and a record R0 having a CKD format are recorded in the leading FBA block, and each field (a COUNT field, KEY field and DATA field) of records R1, R2, . . . having the CKD format is recorded in the other FBA blocks. This arrangement is such that even if a format-write processing instruction for format-write from the record R1 is received from a host device, a disk control unit will not read the FBA block of HA/R0 out to a cache memory and will read out only FBA blocks from record R1 onward. As a consequence, write processing from record R1 onward can be performed in memory with ease and format-write processing can be executed at high speed.

14 Claims, 26 Drawing Sheets

LOGICAL BLOCK OF FBA FORMAT

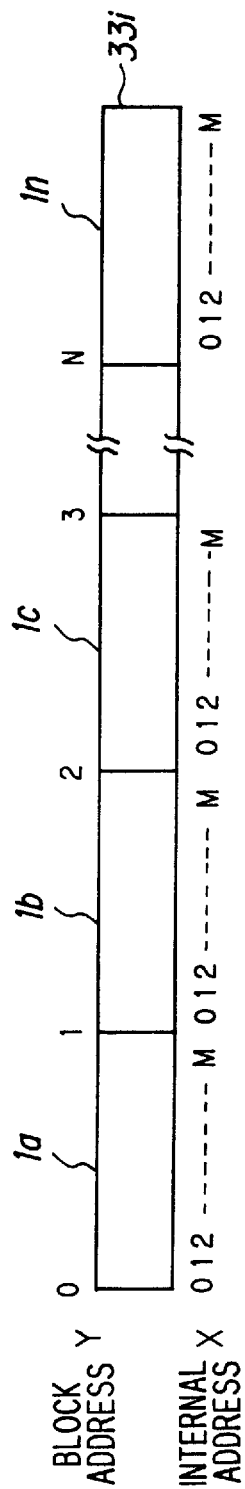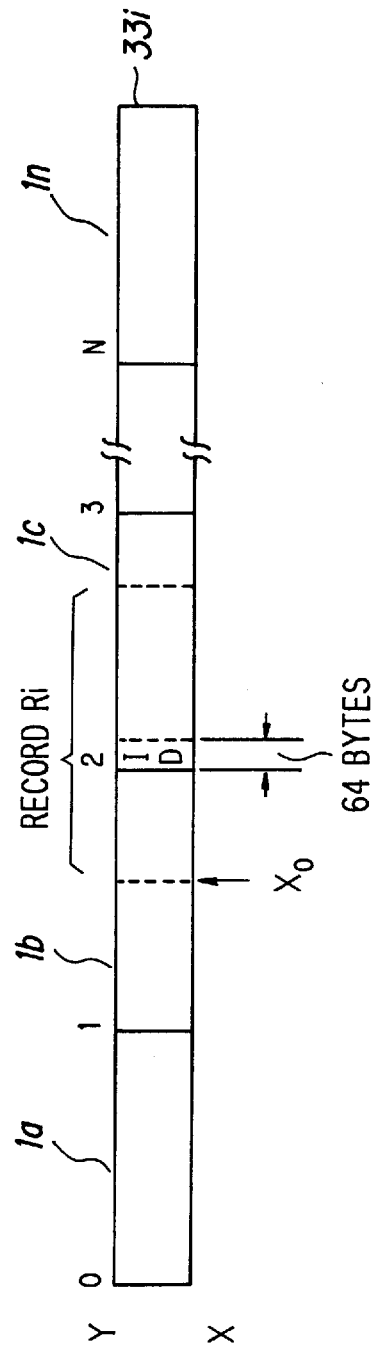

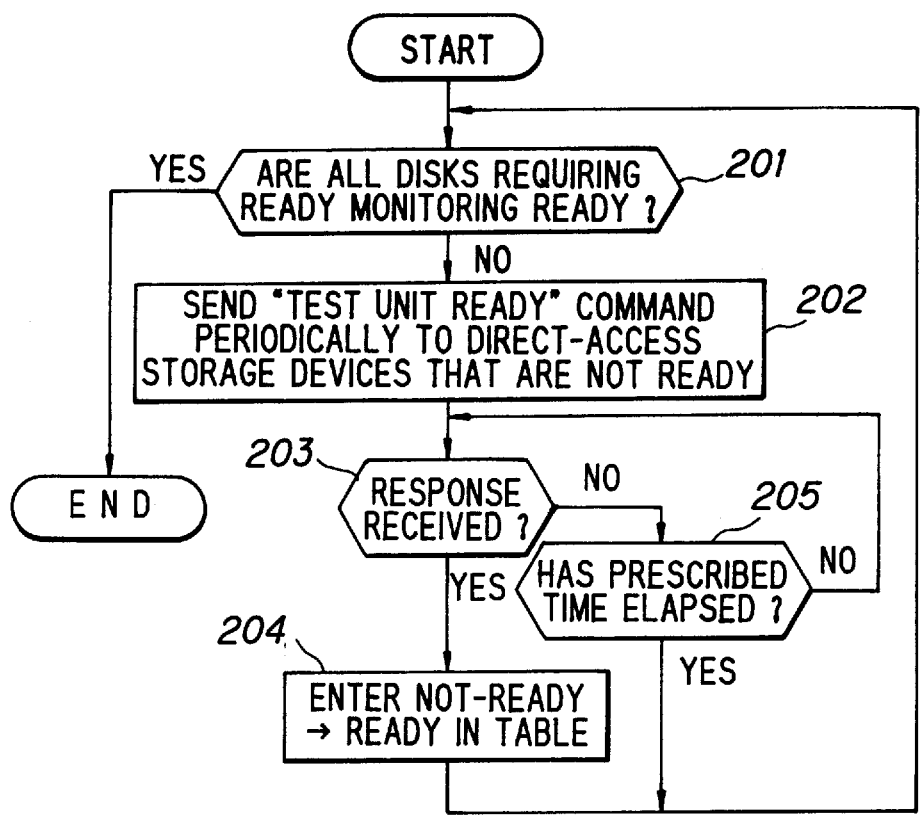

FIG.24

| LOGICAL ADDRESS OF DISK | DEFECTIVE TRACK | ALTERNATE TRACK |
|---|---|---|
| DISK DEVICE 1 | CCHH | CCHH |
| | CCHH | CCHH |
| | --- | --- |
| | --- | --- |
| DISK DEVICE 2 | CCHH | CCHH |
| | --- | --- |
| | --- | --- |

METHOD OF CONTROLLING A DISK DEVICE BY DISK CONTROL UNIT

BACKGROUND OF THE INVENTION

This invention relates to a method of controlling a disk device by a disk control unit. More particularly, the invention relates to a method of controlling a disk device by a disk control unit provided between a host device and a disk device for performing an emulation (format conversion) between a CKD format and an FBA format in memory and accessing the disk device in fixed-length units.

A magnetic disk subsystem has a direct-access storage device (DASD) serving as an I/O device, and a disk control unit provided between a host device and the direct-access storage device for controlling the writing of data to the direct-access storage device and the reading of data from the direct-access storage device.

Since the direct-access storage device performs a mechanical operation, it is difficult to achieve a high speed in which access time is on the order of milliseconds. The access time attained is significantly less than that of a semiconductor memory. Accordingly, a disk control unit internally equipped with a cache memory for the purpose of raising access speed has been made available. This device, which utilizes the fact that access from the host tends to concentrate on specific data in the direct-access storage device, copies data referred to frequently to the cache memory and, when re-access to the copied data is required, transfers the data directly from the cache memory rather than access the data in the direct-access storage device. Since the data is rearranged based upon an LRU (least recently used) algorithm, data having a high frequency of access at the time is retained. Thus, data having a high frequency of access does not require a mechanical operation, thereby making it possible to greatly shorten I/O response time.

FIG. 2 is a diagram showing the configuration of a system which includes a disk control unit (DCU) equipped with a cache memory. Numeral 10 denotes a host device (CPU) provided with a plurality of channels 20a, 20b, 20c . . . a disk control unit (DCU) 30 and direct-access storage devices (DASD) 40a~40f.

The disk control unit 30 includes channel adapters (CA) 31a~31c and 31a'~31c ' for interfacing the host device 10, device adapters (DA) 32a~32c and 32a'~32c ' for interfacing the direct-access storage devices, a cache memory 33, cache function engines (CFE) 34a, 34a' for managing the cache memory and executing processing such as a hit/miss decision, resource managers (RM) 35a, 35a' for performing control related to overall resource management and processing operations, service adapters (SA) 36a, 36a' for executing IML (initial microprogram loading), status monitoring processing and malfunction recovery processing with regard to each of the units, and non-volatile memories (PS) 37a, 37a', such as magnetic disk devices, for storing microprograms for control of each unit.

The foregoing units are interconnected by buses 38a, 38a', each of which has a C-BUS, a D-BUS and an S-BUS, not shown. The C-BUS is a control bus through which each unit communicates messages and accesses control information, the D-BUS is a data transfer bus through which each unit performs an exchange of data, and the S-bus is a service bus through which the service adapters 36a, 36a' serve as masters for managing the status of each unit. A control panel, not shown, is connected to the service adapters 36a. 36a'.

The disk control unit of FIG. 2 has a redundant structure arranged in symmetrical left and right halves about a center dashed line (G0 represents a first controller side or Group 0 and G1 represents a second controller side or Group 1). The cache memory 33 constitutes a common or shared module. The CPU 10 is connected to the channel adapters CA of the first controller side G0 and second controller side G1 via prescribed channels, and the direct-access storage devices (DASD) 40a~40f are capable of being accessed from the first controller side G0 and second controller side G1. Accordingly, even if channel adapters or device adapters on one side fail, the CPU 10 can still access the direct-access storage devices from the channel adapters or devices adapters on the other side.

The channel adapters 31a~31c', device adapters 32a~32c ', cache function engines 34a~34a', resource managers 35a~35a' and service adapters 36a, 36a' are each constituted by a microprocessor and generally have the construction shown in FIG. 3. Specifically, each device includes a microprocessor (MPU) 51, a control store (CS) 52 comprising a RAM, a control store (CS) 53 comprising a ROM, a driver/receiver (DV/RV) 54 connected to the internal buses 38a, 38a', bus interface logic (BIL) 55, a driver/receiver (DV/RV) 56 connected to an external interface, a buffer or control table store (TS) 57 and a separate LSI (gate array) 58. The control table store 57 of the resource managers 35a, 35a' store various control tables, such as an exclusive management table EAT (not shown), a path group table PGT and a physical construction table PCT, by way of example.

Data is stored on each track of a direct-access storage device in accordance with a CKD format. FIG. 4 is a diagram for describing the CKD data format. The track has several areas demarcated by gaps and is provided at its head with an index mark. A home address area provided after the index mark HA is an area which describes the address of the track on which it is present. A plurality of records R0, R1, R2, . . . composed of a count area C, key area K and data area D are written after the home address area. A track address CCHH (where CC represents a cylinder address and HH represents a head address), a record number R and lengths of the succeeding key and data areas, etc., are written in the counter area C. Accordingly, the individual records can be designated by designating the track address and record number. It is not always necessary to write a retrieval key in the key area K. User data is written in the data area D. It should be noted that the record R0 at the head of the track is composed of a count area C and data area D and does not have a key area.

In accordance with the disk control unit (DCU) 30, data is read and written in the manner described below. FIGS. 5 and 6 are diagrams for describing the flow of a record when data is read. FIG. 5 illustrates the flow in a case where a read hit is not achieved (a case in which a read record is not present in the cache memory), and FIG. 6 shows the flow when there is a read hit. A buffer BF incorporated within the cache function engine CFE stores an address (CCHHR) of a record present in the cache memory CM and a flag FLAG indicating whether the record has been saved in a direct-access storage device DASD (where "1" logic in the flag indicates that the record has not been saved and "0" indicates that the record has been saved).

When a seek command SK is issued by a channel device CH, the channel adapter CA queues the seek command in a command queue and subsequently sends an operation-finished signal back to the channel device CH to make it appear that the seek operation has ended. The channel device CH issues a set-sector command SS in response to reception of the seek operation-finished signal. When this command is received, the channel adapter CA queues the command and then sends an operation-finished signal back to the channel device CH to make it appear that the set-sector operation has ended. The channel device CH issues a search ID command SID in response to reception of the set-sector operation-finished signal. When this command is received, the channel adapter CA inquires of the cache function engine CFE whether the record of the requested address (CCHHR) is present in the cache memory CM.

If the requested record is not present in the cache memory CM, then the channel adapter CA informs the resource manager RM of this fact and issues a retry signal in order to cut off the channel device CH from the disk control unit DCU. In response to reception of the retry signal, the channel device CH is temporarily cut off from the disk control unit DCU and is capable of executing services for another disk control unit during this time. Further, in a case where a command request signal is received subsequently after the channel device CH is cut off in response to reception of the retry signal, the command issued immediately prior thereto (the search ID command in this example) is re-sent.

The resource manager RM refers to the exclusive control table to verify that the direct-access storage device sought is not in the process of being accessed, determines the prescribed device adapter DA, notifies the channel adapter CA of the identification data of this device adapter and notifies this device adapter DA of the identification data of the channel adapter.

The channel adapter CA delivers the CKD track position (CCHH) contained in the seek command to the notified device adapter DA and designates staging. When staging is designated, the device adapter DA reads one designated CKD track (CCHH) of data and notifies the resource manager RM of designation of recombination with the channel device CH. Further, the device adapter DA writes the read data in the cache memory CM (see FIG. 5). After the writing operation, the device adapter DA notifies the cache function engine CFE of end of staging.

Then, in response to designation from the resource manager RM, the channel adapter CA sends a command request signal to the channel device CH. Upon receiving the command request, the channel device CH reissues the search ID command SID issued last. If the channel adapter CA receives the search ID command SID, it retrieves the designated record in the cache memory CM and sends a search ID operation-finished signal to the channel device CH in response to end of retrieval. If the channel device CH receives the search ID operation-finished signal, it issues a read command RD. If the channel adapter CA receives the read command RD, it reads the searched record out of the cache memory CM and transfers this record to the channel device CH (see arrow B in FIG. 5).

If, on the other hand, the record requested by the search ID is present in the cache memory CM (read hit), the channel adapter CA sends a command request signal to the channel device CH. Upon receiving the command request, the channel device CH issues the read command RD. Upon receiving the read command RD, the channel adapter CA reads the requested record out of the cache memory CM and transfers it to the channel device CH. (see arrow C in FIG. 6).

FIGS. 7 and 8 are diagrams for describing the flow of a record when data is written. FIG. 7 illustrates the flow in write-thru, and FIG. 8 shows the flow when there is a write hit.

When the seek command SK is issued by a channel device CH, the channel adapter CA queues the seek command in a command queue and subsequently sends an operation-finished signal back to the channel device CH to make it appear that the seek operation has ended. The channel device CH issues the set-sector command SS in response to reception of the seek operation-finished signal. When this command is received, the channel adapter CA queues the command and then sends an operation-finished signal back to the channel device CH to make it appear that the set-sector operation has ended. The channel device CH issues the search ID command SID in response to reception of the set-sector operation-finished signal. When this command is received, the channel adapter CA inquires of the cache function engine CFE whether the record of the requested address (CCHHR) is present in the cache memory CM.

If the requested record is not present in the cache memory CM, then the channel adapter CA informs the resource manager RM of this fact and issues a retry signal in order to cut off the channel device CH from the disk control unit DCU. In response to reception of the retry signal, the channel device CH is temporarily cut off from the disk control unit DCU.

The resource manager RM refers to the exclusive control table to verify that the direct-access storage device DASD sought is not in the process of being accessed, determines the prescribed device adapter DA, notifies the channel adapter CA of the identification data of this device adapter and notifies this device adapter DA of the identification data of the channel adapter CA.

The channel adapter CA delivers the position parameter (CCHH) contained in the seek command to the notified device adapter DA, causes the direct-access storage device DASD to execute a seek operation, delivers the position parameter (sector value) contained in the set-sector command in response to completion of the seek operation and causes the direct-access storage device DASD to execute the set-sector operation in similar fashion. If the set-sector operation is completed, the channel adapter CA sends a channel-command request signal to the channel device. Upon receiving the command request, the channel device CH reissues the search ID command SID issued last. If the channel adapter CA receives the search ID command SID, it delivers the parameter (record number R) of the search ID to the device adapter DA, causes the direct-access storage device DASD to execute the search ID operation and, if the search operation is completed, sends the operation-finished signal to the channel device CH.

If the channel device CH receives the search operation-finished signal, it issues a read command RD. If the channel adapter CA receives the read command RD, it writes the data (the record) in the cache memory CM and also writes the data in the command address CCHHR of the direct-access storage device DASD via the device adapter DA (see arrows D and E in FIG. 7). Furthermore, the address (CCHHR) (flag "0") of the written record is stored in the memory of the cache function engine CFE.

The foregoing processing is referred to as "write-thru". In write-thru, the record is written in the direct-access storage device DASD in concurrence with the writing of the record in the cache memory. The result is a low access speed. Accordingly, a disk control device also is available in which access speed is raised by providing a non-volatile memory NVS within he disk control unit DCU and terminating the writing operation upon writing the record in the non-volatile memory in concurrence with the writing of the record in the cache memory.

If, on the other hand, the record at the address (CCHHR) requested by the search ID is present in the cache memory CM (write hit), the channel adapter CA sends a command request signal to the channel device CH. Upon receiving the command request, the channel device CH issues the write command WD. Upon receiving the write command WD, the channel adapter CA rewrites the record of CCHHR that has been stored in the cache memory CM (see arrow F in FIG. 8). At this time the flag corresponding to CCHHR stored in the memory of the cache function engine CFE is changed to "1". Thereafter, independently of the operation of the host, the disk control unit writes the record of CCHHR for which the flag is "1" from the cache memory CM to the direct-access storage device DASD (this is referred to as "write-back"; see arrow G in FIG. 8) and makes the flag "0" in response to write-back.

In a case where the operating system (OS) is handling data using the CKD format, only a disk device (CKD disk device) premised on the CKD format can be connected to the disk control unit DCU.

In recent years, advances in technology have made it possible to greatly increase the capacity of an FBA (fixed-block architecture) disk device possessing an interface such as an SCSI, and it is becoming possible to realize a capacity comparable with that of the conventional CKD disk device. In comparison with the CKD disk device, for which the utilization environment is limited, an FBA disk device is superior is terms of price, power consumption and area needed for installation.

As shown in FIG. 9, the FBA format is such that the lengths of all logic blocks (FBA blocks) are equal, with one CKD track being partitioned into a prescribed number of FBA blocks. The FBA blocks have identification numbers 1, 2, 3 . . . specific to them, and a 64-byte ID portion (an ID portion for COF) for a CKD·FBA format conversion (COF conversion: CKD ON FBA) is provided at the head of each FBA block. Further, an ID portion (block ID portion for FBA) storing the FBA block address (the identification umber of the FBA block) is provided ahead of each FBA block.

Such an FBA disk device is small in size and low in price and maintains a performance that allows it to be used fully as an external storage device for a large-scale computer system.

According to a CKD control method, it is required that the CKD format transferred from the host device be converted to the FBA format within the disk control unit in order that the FBA disk device can be applied to a system in which the host device handles data (see FIG. 10). Further, in a case where FBA block data is read from an FBA disk via an SCSI interface, it is required that the FBA block data be transferred to the host device after it is converted to the CKD format.

An effective method of performing the CKD·FBA format conversion (COF conversion) is not available in the prior art. In particular, in a case where use is made of the CKD disk device, the disk control unit reads a record upon performing a positioning operation conforming to the seek command, set-sector command and search ID command from the host device. However, in a case where the FBA disk device is used, it is not possible in the prior art to perform control similar to that in the case of the CKD disk by a seek command, set-sector command and search ID. Accordingly, the inventors have proposed, in the specification of Japanese Patent Application No. 5-286339 (filed on Nov. 16, 1993), a method of controlling a disk control unit so adapted that even if the disk device is an FBA disk device, control can be carried out in the same manner as performed in the case of a CKD disk device.

In accordance with this proposed control method, control can be carried out in the same manner as performed in the case of a CKD disk device even if the device is an FBA disk device. However, there is room for improvement since the proposed method is inadequate in terms of the improvements in efficiency and speed of the read and write operations of the FBA disk device.

Further, in the proposed method described above, consideration is not given to case where write processing from the host device is interrupted while in progress or to a case where a defect develops in a track of the FBA disk.

SUMMARY OF THE INVENTION

Accordingly, a first object of the present invention is to provide a method of controlling disk device by a disk control unit whereby even if the disk device is an FBA disk device, control can be carried out in the same manner as performed in the case of a CKD disk device, and whereby read/write operations of the FBA disk can be improved in efficiency and speed.

A second object of the present invention is to provide a method of controlling a disk device by a disk control unit in which, even if data has been recorded on an FBA disk incorrectly because of an interruption in write processing from a host device, the incorrect data will not be transferred to the host device.

A third object of the present invention is to provide a method of controlling a disk device by a disk control unit in which, if a track of an FBA disk develops a defect, correct data can be written on an alternate track instead of the defective track, the correct data can be read from the alternate track and transferred to the host device.

A fourth object of the present invention is to provide a method of controlling a disk device by a disk control unit whereby even if the disk device is an FBA disk device, control can be carried out in the same manner as performed in the case of a CKD disk device, and whereby processing for substituting a track for a defective track can be improved in efficiency and speed.

In accordance with the present invention, the first object of the invention is attained by providing a method of controlling a disk device by a disk control unit provided between a host device, which issues read/write commands considering a slave device as being a storage device in which a recording format is of variable length (a CKD format), and a disk device having a recording format of a fixed length (an FBA format), for performing an emulation between the CKD format and the FBA format in memory and accessing the disk device in fixed-length units, comprising the steps of dividing one CKD track on a disk into a plurality of fixed-length FBA blocks, recording only a home address HA of the CKD track and a record R0 having the CKD format in a starting FBA block, and recording each field (a COUNT field, KEY field and DATA field) of records R1, R2, . . . having the CKD format in the other FBA blocks.

Further, according to the present invention, the control method for attaining the first object includes a step of recording, in an ID portion provided at the head position of each FBA block, the numbers of records and the positions of the records included in the FBA block, wherein when a head positioning command is issued from the host device in an CKD format, the disk control unit obtains an FBA block number from a parameter value in the positioning command, reads blocks from the FBA block designated by the FBA block number to the final FBA block within the CKD track to which the first-mentioned FBA block belongs, develops these blocks in memory and retrieves a record, which has been designated by the host device, in the memory by referring to the information recorded in the ID portion.

Further, according to the present invention, the control method for attaining the second object-includes a step of registering a flag, which indicates whether write processing from the host device has been interrupted or not, in the ID portion of the FBA block of every field of each record, referring to the flag of a field which is the object of a read instruction from the host device, reading data of the field out of memory and transferring it to the host device if the flag does not indicate that writing has been interrupted, and refraining from transferring the data of the field to the host device if the flag indicates that writing has been interrupted.

Further, according to the present invention, the control method for attaining the third and fourth objects of the invention includes a step of providing a control table, which indicates correspondence between defective tracks and alternate tracks, in the disk control unit per each disk device, checking by referring to the control table, at reception of a processing instruction for a prescribed track from the host device, to determine whether the track is a defective track, obtaining an alternate track from the control table in case of a defective track, and subjecting the alternate track to processing designated by the host device.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 17A, 17B are diagrams for describing data access to a cache memory;

FIG. 20 shows a status-monitoring processing flow;

FIG. 21 is a diagram for describing a status monitoring table;

FIG. 24 is a diagram showing the constitution of a defective-track/alternate-track table;

DESCRIPTION OF THE PREFERRED EMBODIMENT

(A) Overview of the Invention

Figure 1:
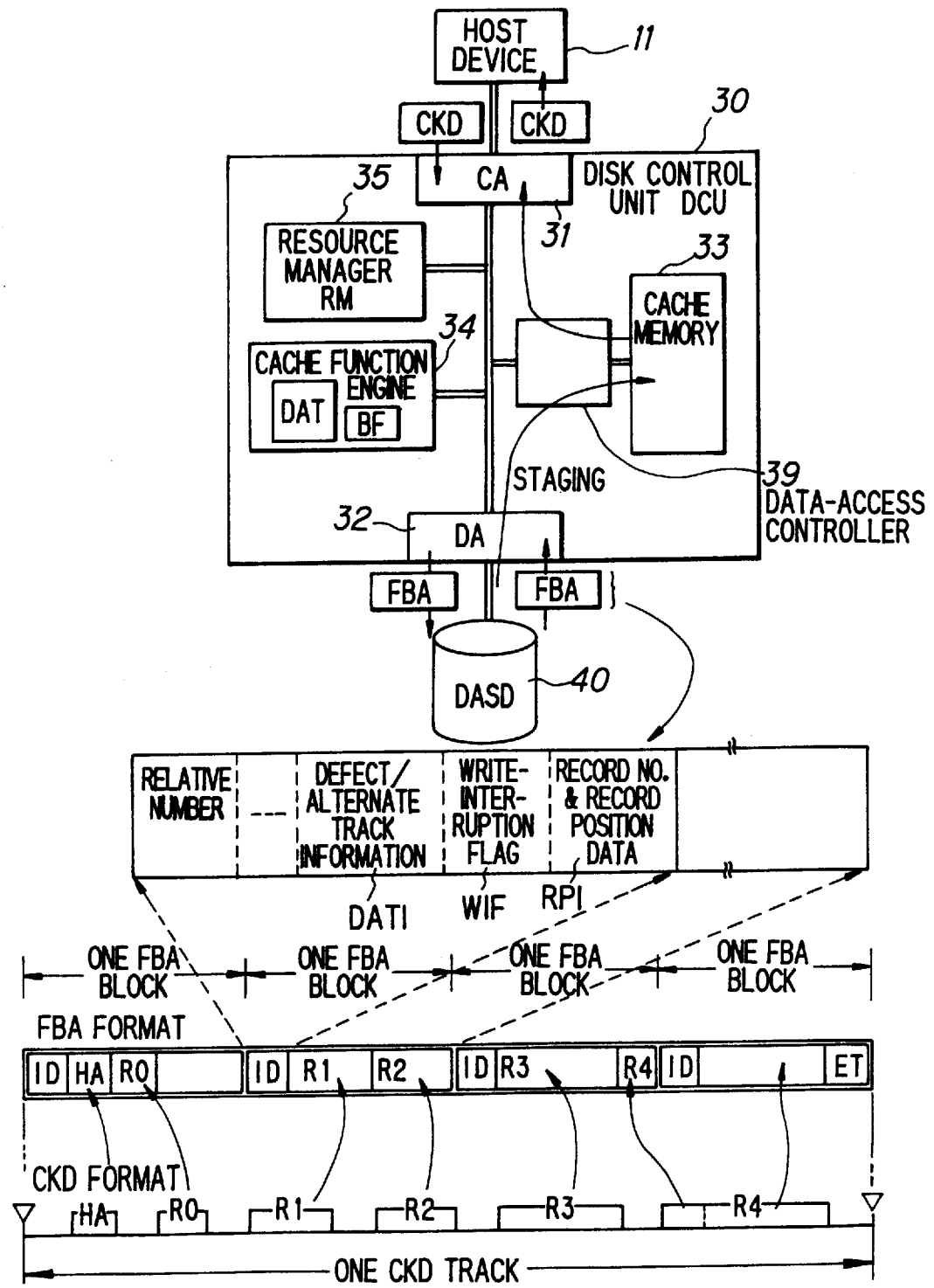
FIG. 1 is a diagram for describing the principles of the present invention.
Figure 2:
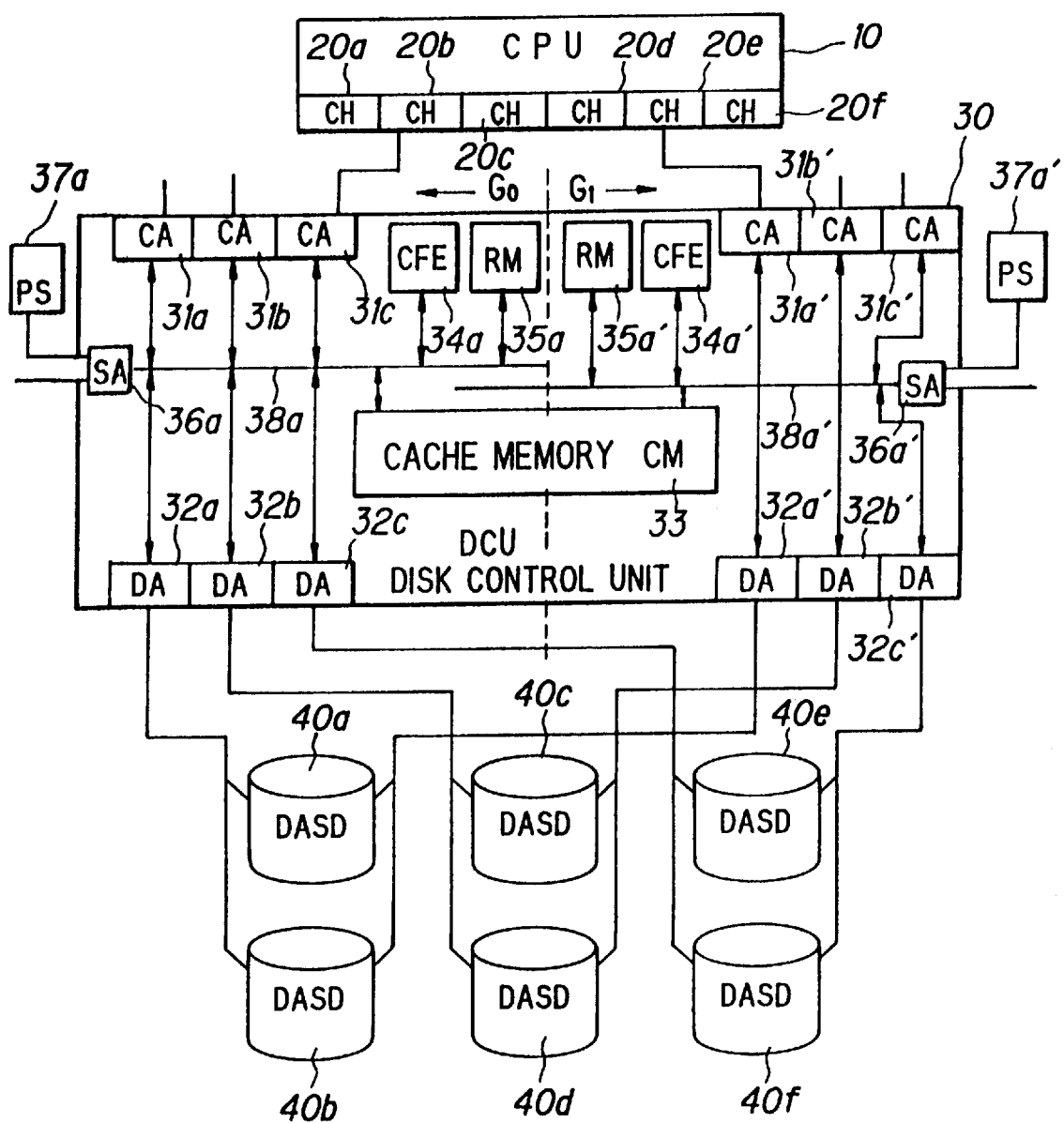
FIG. 2 is diagram showing the configuration of a system which includes a disk control unit having a cache memory.
Figure 3:
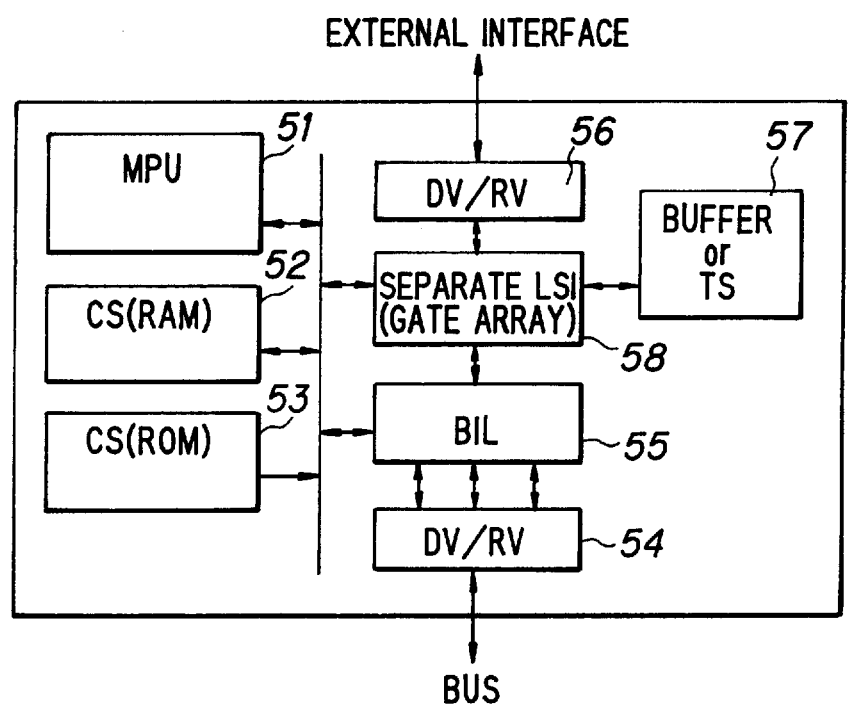
FIG. 3 is a diagram showing the constitution of a CA, a DA and an RM.
Figure 4:
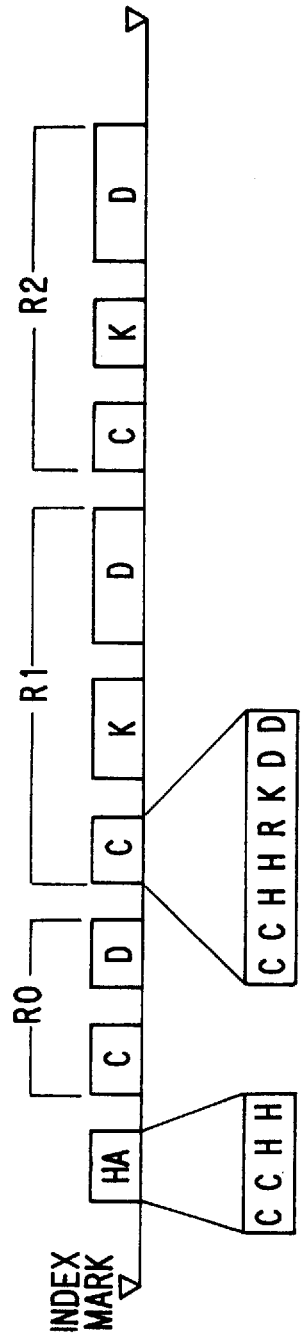
FIG. 4 is a diagram for describing a CKD format.
Figure 5:
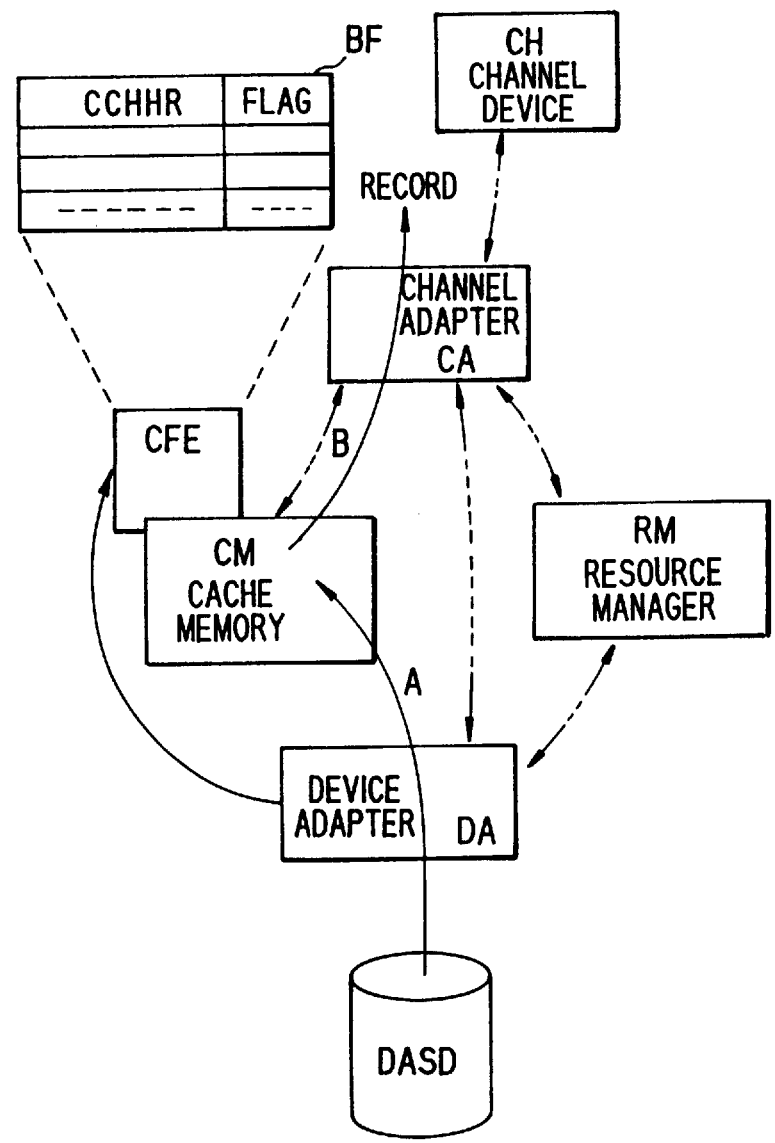
FIG. 5 is a diagram for describing reading of data (in a case where a read hit is not achieved)
Figure 6:
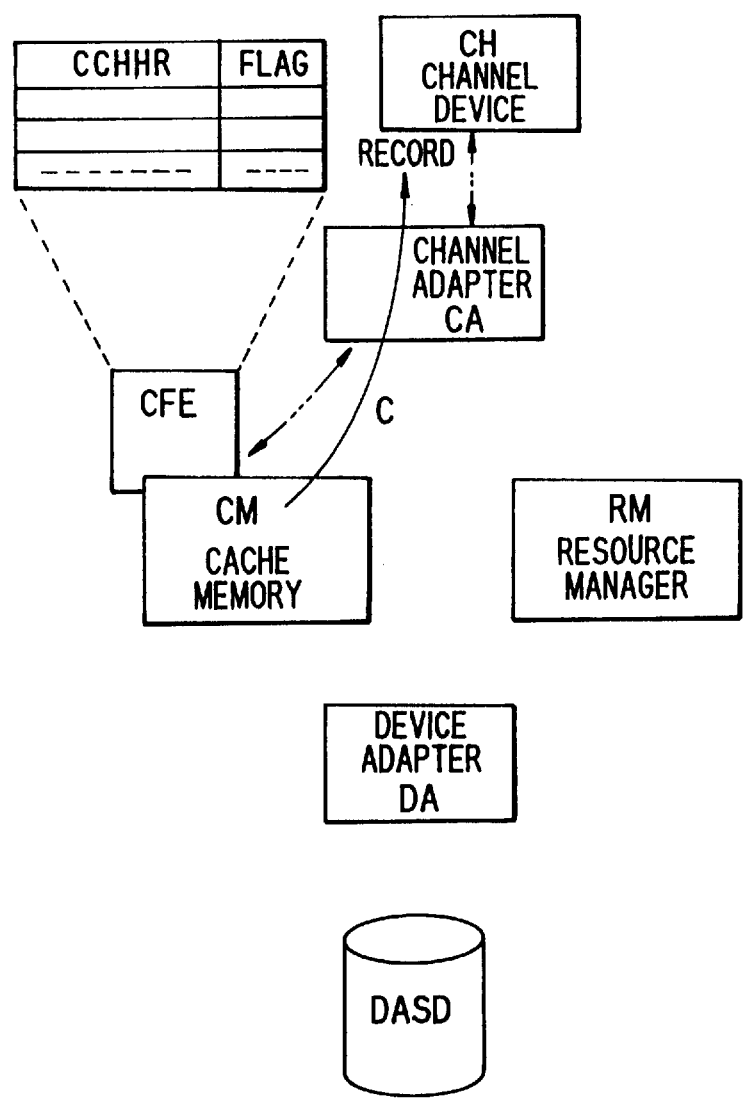
FIG. 6 is a diagram for describing reading of data (in case of a read hit)
Figure 7:
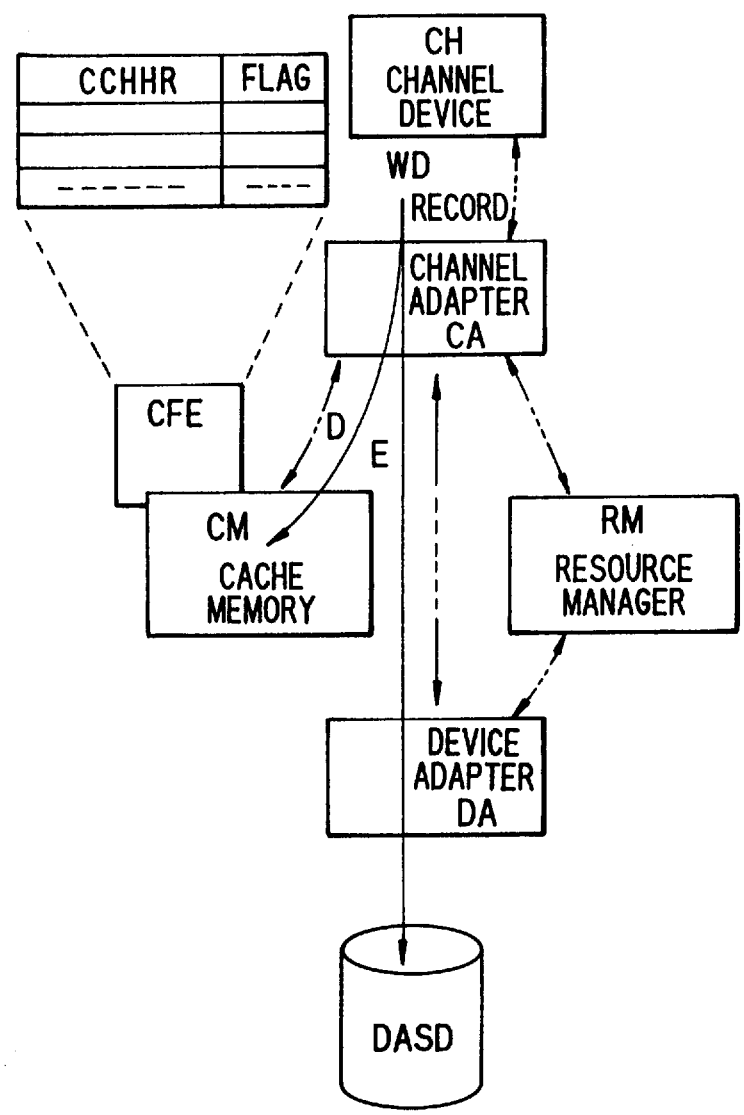
FIG. 7 is a diagram for describing writing of data (in case of write-thru)
Figure 8:
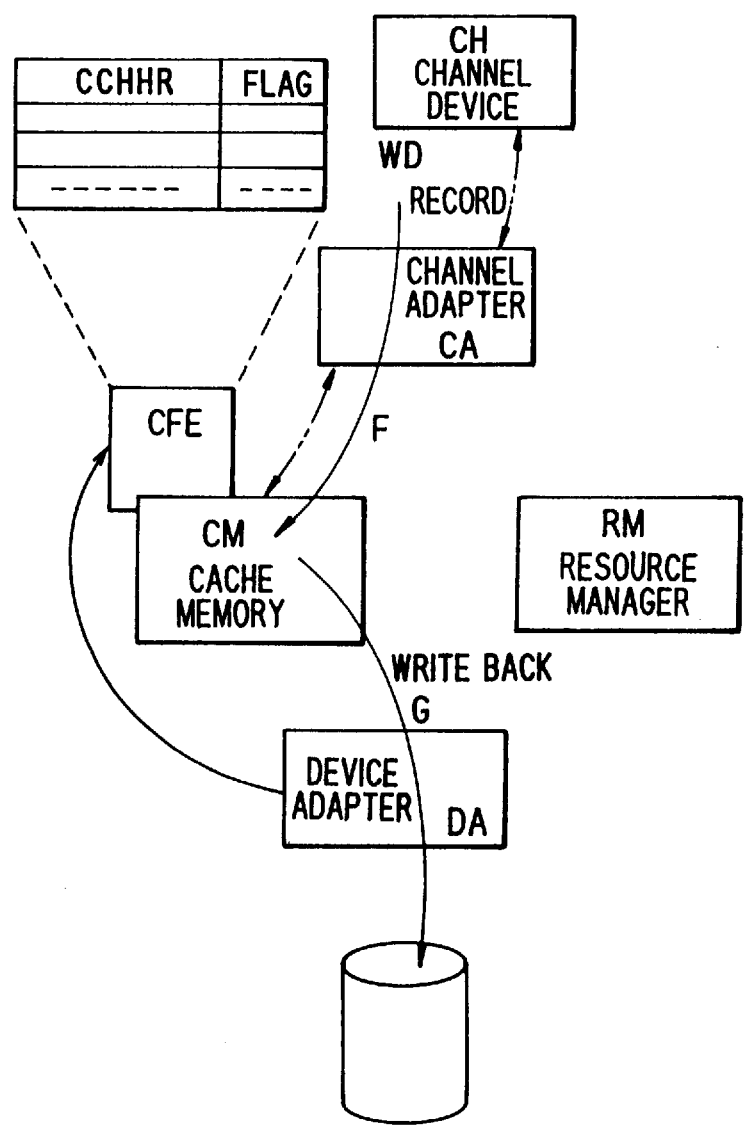
FIG. 8 is a diagram for describing writing of data (in case of write hit and write-back)
Figure 9:
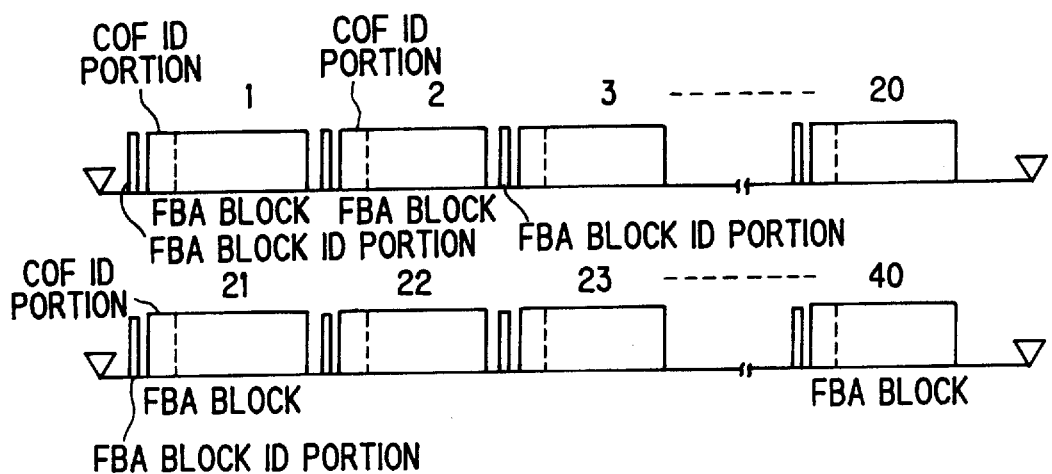
FIG. 9 is a diagram for describing an FBA format.
Figure 10:
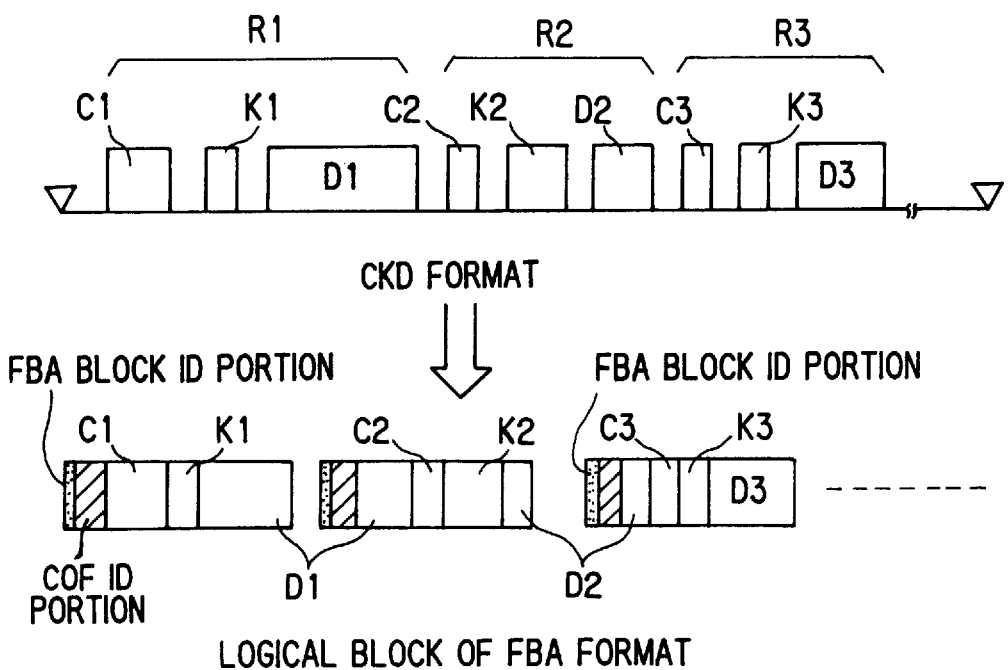
FIG. 10 is a diagram for describing a CKD·FBA format conversion.

FIG. 1 is a diagram for describing an overview of the present invention.

Shown in FIG. 1 are a host device 11, which issues read/write commands considering a slave device as being storage device having a CKD format, the disk control unit (DCU) 30 and the direct-access storage device (DASD) 40 for reading/writing of data in the FBA format. The direct-access storage device 30 includes a channel adapter (CA) 31 for interfacing the host device 11, a device adapter (DA) 32 for interfacing direct-access storage device, a cache memory 33, a cache function engine (CFE) 34 having a defect/alternate management table DAT and a buffer BF, a resource manager 35 for controlling overall resource management and various processing operations, and a data-access controller 39 for controlling data access to the cache memory.

One CKD track on a disk is divided into a plurality of fixed-length FBA blocks, only a home address HA of the CKD track and a record R0 having the CKD format are recorded in the leading FBA block, and each field (a COUNT field, KEY field and DATA field) of records R1, R2, . . . having the CKD format is recorded in the other FBA blocks. This arrangement is such that even if a format-write processing instruction for format-write from the record R1 is received from the host device 11, the disk control unit 30 will not read the FBA block of HA/R0 out to the memory 33 and will read out only FBA blocks from record R1 onward. As a consequence, write processing from record R1 onward can be performed in memory with ease and format-write processing can be executed at high speed.

An ID portion is provided at a prescribed position (the starting position) of each FBA block. The numbers of records and the positions RPI of the records included in the FBA block are recorded in the ID portion. When a head positioning command (a seek command and set-sector command) is issued from the host device in the CKD format, the disk adapter 32 obtains the number of the leading FBA block of a CKD track designated by a parameter value (CKD track number CCHH) in the seek command and positions the head at the position of the FBA block having this number.

Next, the device adapter 32 obtains the FBA block number corresponding to the parameter value (sector value) of the set-sector command, reads all blocks from the FBA block designated by this FBA block number to the last FBA block within the CKD track to which FBA block belongs and develops these blocks in the cache memory 33. Thereafter, the channel adapter 31 retrieves a record, which has been commanded from the host device 11 by a search ID command, in the cache memory 33 by referring to record information RPI recorded in the ID portion. In case of a data-read operation, the channel adapter 31 reads the retrieved CKD record from the cache memory 33 and transfers it to the host device 11. In case of a data-write operation, the channel adapter 31 rewrites the record in the cache memory. Thereafter, the device adapter 32 writes the rewritten record back in the FBA direct-access storage device 40 in FBA block units.

If this arrangement is adopted, positioning control and data retrieval control with regard to a seek command, set-sector command and search ID command can be performed just as in the case of a CKD disk device even if the device is an FBA disk device.

The area for recording a flag WIF indicating whether write processing from the host device 11 has been interrupted or not is provided in the ID portion of the FBA block for every field (COUNT field, KEY field, DATA field) of each record. When the channel adapter 31 writes the data of a COUNT field, KEY field and DATA field of a prescribed record in the cache memory 33, it sets the WIF flag of the field and resets the flag when write processing ends normally. As a result, if processing is interrupted during the write operation, the flag WIF remains in the set state. If a READ instruction of a prescribed field is accepted from the host device 11 under these conditions, the channel adapter 31 refers to the flag WIF of the field in the ID portion, reads the data of the field out to the memory 33 and transfers it to the host device 11 if the flag does not indicate interruption of the write operation. If the flag indicates that the write operation has been interrupted, then the channel adapter 31 does not transfer the data of this field to the host device 11. As a result, interruption of the write operation can be recognized and erroneous data can be prevented from being transferred in response to the READ processing instruction.

When a record extending over a plurality of FBA blocks is read out of the cache memory 33 or written to the cache memory 33, the data-access controller 39 skips the ID portion placed at the beginning of each FBA block and reads the record from or writes it to the cache memory 33. Thus, this arrangement is such that even if a record that has been requested by a write instruction or read instruction from the host device 11 is larger than the size of one FBA block and extends over a plurality of FBA blocks, the record can be written in the cache memory 33 continuously or read out of the cache memory continuously regardless of the presence of the ID portion in each block.

In a case where the direct-access storage device 40 does not possess a function for informing the disk control unit 30 of the fact that the enabled state has been attained by the introduction of power, the device adapter 32 sends the direct-access storage device a command for retrieving the status of the disk periodically, recognizes the fact that the direct-access storage device has attained the enabled state based upon whether the direct-access storage device has responded to the command and then notifies the resource manager 35. As a result, even if a direct-access storage device not having a ready-state notification function is connected as a subordinate, the disk control unit 30 can recognize the transition from not ready to ready with certainty.

A flag indicating whether the home address HA and record R0 have the standard format is stored in the buffer BF of the cache function engine 34 in advance. When an instruction for reading in the home address HA and record R0 of a prescribed track has been issued by the host device 11, the channel adapter 31 refers to the flag. If the standard format is verified, the channel adapter 31 creates a home address HA and record R0 (a pseudo HA/R0) internally and transfers them to the host device 11. Thus, even if a read instruction for the HA/0 portions has been issued by the host device with regard to a track developed in the cache memory 33 starting from record R1, the FBA block in which the HA/0 portions have been recorded need not be read out of the direct-access storage device 40 and can be transferred to the host device at high speed.

In a case where the address HA and record R0 have the standard format and a plurality of consecutive tracks have been developed in the memory starting from record R1, the channel adapter 31 internally creates the HA/0 portions (in the leading FBA block) of each track, thereby assuring the continuity of the FBA blocks in each track. The device adapter 32 sends the direct-access storage device 40 a write instruction in which the operand is (1) the FBA block at which writing is to start and (2) the number N of write blocks and writes the N-number of FBA blocks back to the direct-access storage device continuously over a plurality of tracks.

In a case where the leading FBA block is composed solely of the HA/0 portions, development starts from record R1 in the cache memory 33 without the HA/0 portions being read out. Consequently, if records of a plurality of consecutive tracks have been developed in the cache memory 33, a discontinuous state in which the leading FBA blocks have been omitted is attained. Writing from the device adapter 32 to the FBA direct-access storage device 40 is performed by designating (1) the FBA block at which writing is to start and (2) the number N of write blocks. Therefore, in a case where FBA blocks extending consecutively over a plurality of tracks are written back to this direct-access storage device, it is necessary to issue one write command per each range (track) of consecutive blocks if the leading FBA blocks have been omitted. However, in accordance with the present invention, the leading block of each track is created internally so that the continuity of the FBA blocks of each track can be maintained. As a result, data from a plurality tracks in the cache memory can be written back by a single write command and overhead in terms of the SCSI interface can be reduced.

The defect/alternate table DAT indicating the correspondence between defective tracks and alternate tracks is provided in the device control unit. Upon receiving an instruction from the host device for processing regarding a prescribed track, the channel adapter 31 refers to the table DAT, determines whether the track is defective and, if the track is defective, obtains an alternate track and subjects this track to the processing designated by the host device. If this arrangement is adopted, the alternate track can be accessed directly without accessing the defective track, thus making high-speed access possible.

Tracks (cylinders) used as alternate tracks are set in advance and (1) a flag indicating whether a track is actually being used as the alternate track of a defective track and (2), if the track is actually being used as the alternate track of a defective track, the track address of this alternate track and the track address of the defective track are registered in the ID portion of the leading FBA block of each track. After power is introduced or a resetting operation performed, the device adapter 32 reads the leading FBA block of each track and notifies the cache function engine 34, and the latter creates the defect/alternate table DAT. If this arrangement is adopted, the defect/alternate table can be created even if power is cut off or even if stored data is reset.

When a defect/alternate processing instruction has been received from the host device 11, the cache function engine 34 enters the track addresses of the defective track and alternate track designated by the instruction into the defect/ alternate table DAT, thereby updating the table. If this arrangement is adopted, the latest correspondence between defective and alternate tracks is stored in memory at all times. As a result, a defective track will not be accessed erroneously.

Defect/alternate track information DATI which includes (1) a flag indicating whether a track is normal/defective and (2), in case of a defective track, the track address of the alternate track are stored in the ID portions of all FBA blocks. The channel adapter 31 or device adapter 32 investigates the ID portions of FBA blocks that have been developed in the memory 32 and, if the adapter determines that an FBA block has been recorded on a defective track, positions the head on the alternate track immediately, reads out the necessary data, develops the data in memory and enters the newly determined correspondence between the defective and alternate tracks in the table DAT.

If this arrangement is adopted, data can be written in memory from an alternate track even in a case where updating of the table DAT based upon the defect/alternate processing instruction from the host device 11 has failed.

(B) Embodiment
(a) System configuration of the invention

Figure 11:
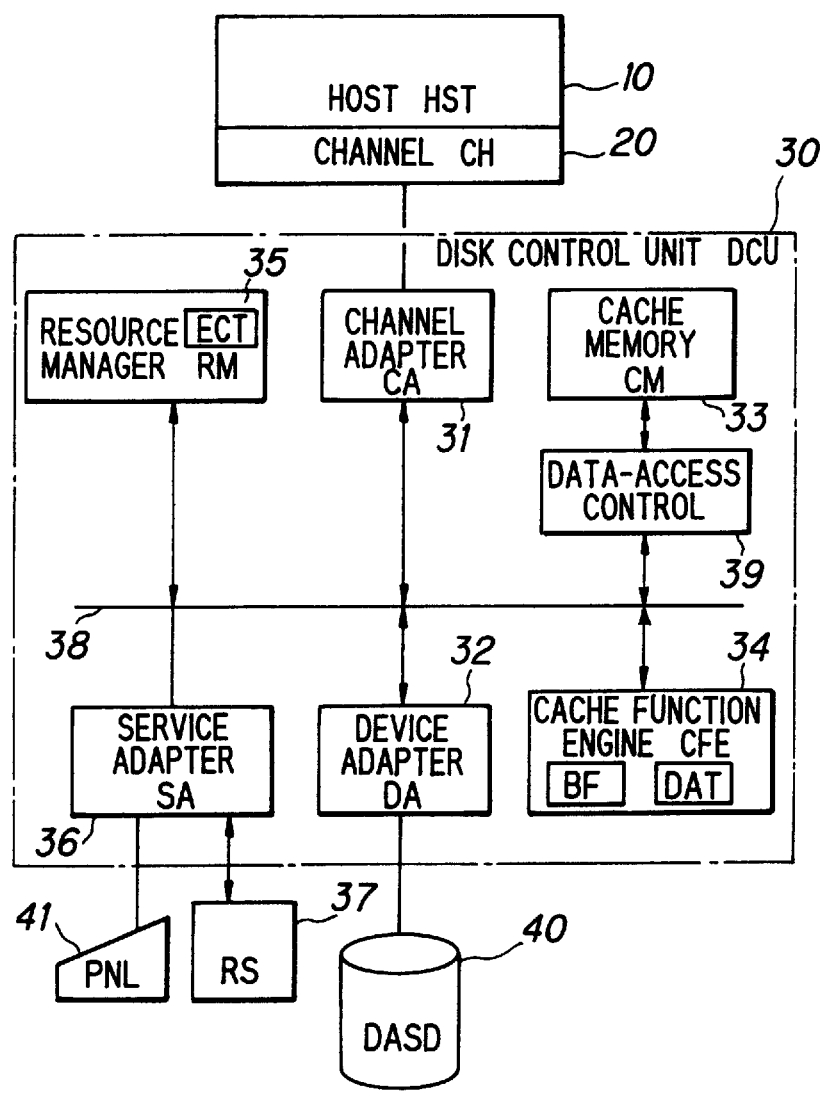
FIG. 11 is a block diagram illustrating the system configuration of the present invention.

FIG. 11 is a block diagram illustrating the system configuration of the present invention. The arrangement is such that positioning control and data read/write control can be performed just as in the case of a CKD disk device even if the device is an FBA disk device. In order to simplify the description, only one channel adapter, one device adapter, one direct-access disk device and one channel are shown.

Shown in FIG. 11 are the host device (CPU) 10 equipped with an OS for handling data in the CKD format, the channel (CH) 20, the disk control unit (DCU) 30, and the direct-access disk device (DASD) 40 for reading/writing data in the FBA format.

The disk control unit 30 includes the channel adapter (CA) 31 for interfacing the host device 10, the device adapter (DA) 32 for interfacing direct-access storage device 40, the cache memory (CM) 33, the cache function engine (CFE) 34 for executing management of the cache memory CM and processing track defect/alternate management, the resource manager (RM) 35 for performing control related to overall resource management and processing operations, and the service adapter (SA) 36 for executing IML processing, status monitoring processing and malfunction recovery processing with regard to each of the units. Connected to the DCU 30 are the non-volatile memory 37 for storing microprograms for control of each unit as well as control tables, and the data-access controller 39 for performing data-access control with regard to the cache memory 33. The foregoing units are interconnected by a bus 38, which has a C-BUS, a D-BUS and an S-BUS, which are not shown.

The cache function engine 34 includes the flag buffer BF and the defect/alternate track table DAT. The flag buffer BF stores (1) the address (CCHHR) of a record present in the cache memory CM, (2) a flag FLAG indicating whether the record has been saved in the direct-access storage device DASD (logical "1" indicating that the record has not been saved and logical "0" indicating that it has), and (3) a standard format flag indicating whether HA/0 has the standard format.

The channel adapter 31, device adapter 32, cache function engine 34 and resource manager 35 are each constituted by a microprocessor. Initially, the control microprograms and control tables are loaded (IML) from the non-volatile memory 37 under control performed by the service adapter SA.

(b) Constitution of FBA block

Figure 12:
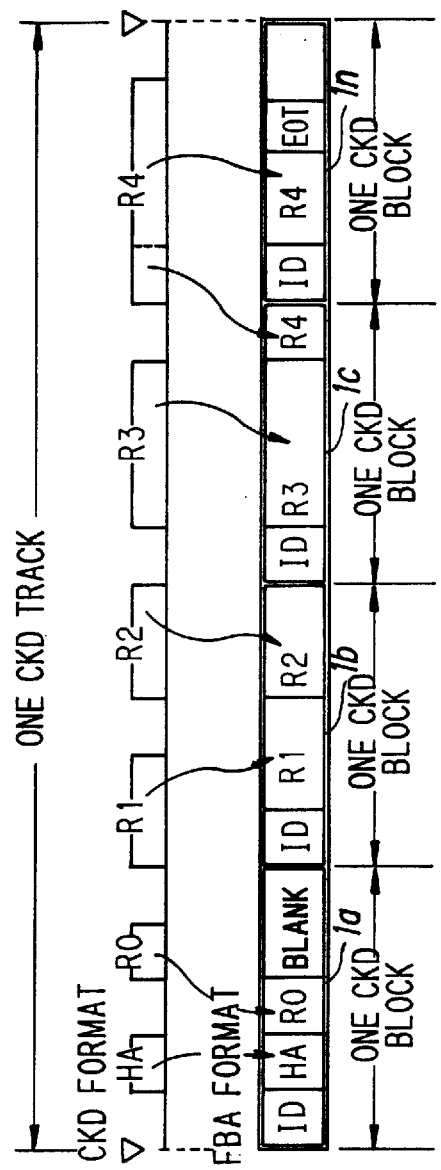
FIG. 12 is a diagram for describing one CKD track of FBA blocks.

FIG. 12 is a diagram for describing one CKD track of FBA blocks according to the present invention. One CKD track on the disk is divided into a plurality of fixed-length FBA blocks 1a, 1b, . . . 1n. For explanatory purposes, a case is described in which one CKD track is composed of four FBA blocks.

A 64-byte ID portion (an ID portion for COF, hereinafter referred to simply as an "ID portion") is provided at the head of each FBA block. Each field of the CKD data (records) is registered to follow the ID portion. Recorded in the starting FBA block 1a are only (1) the home address portion HA of the CKD track and (2) the record R0 having the CKD format; the rest of this block is blank. A COUNT field, KEY field and DATA field of records R1, R2, . . . having the CKD format are recorded in the other FBA blocks 1b~1n at predetermined lengths. There are cases where a plurality of records are recorded in each FBA block other than the starting block and cases where one record is recorded over a plurality of FBA blocks.

Figure 13:
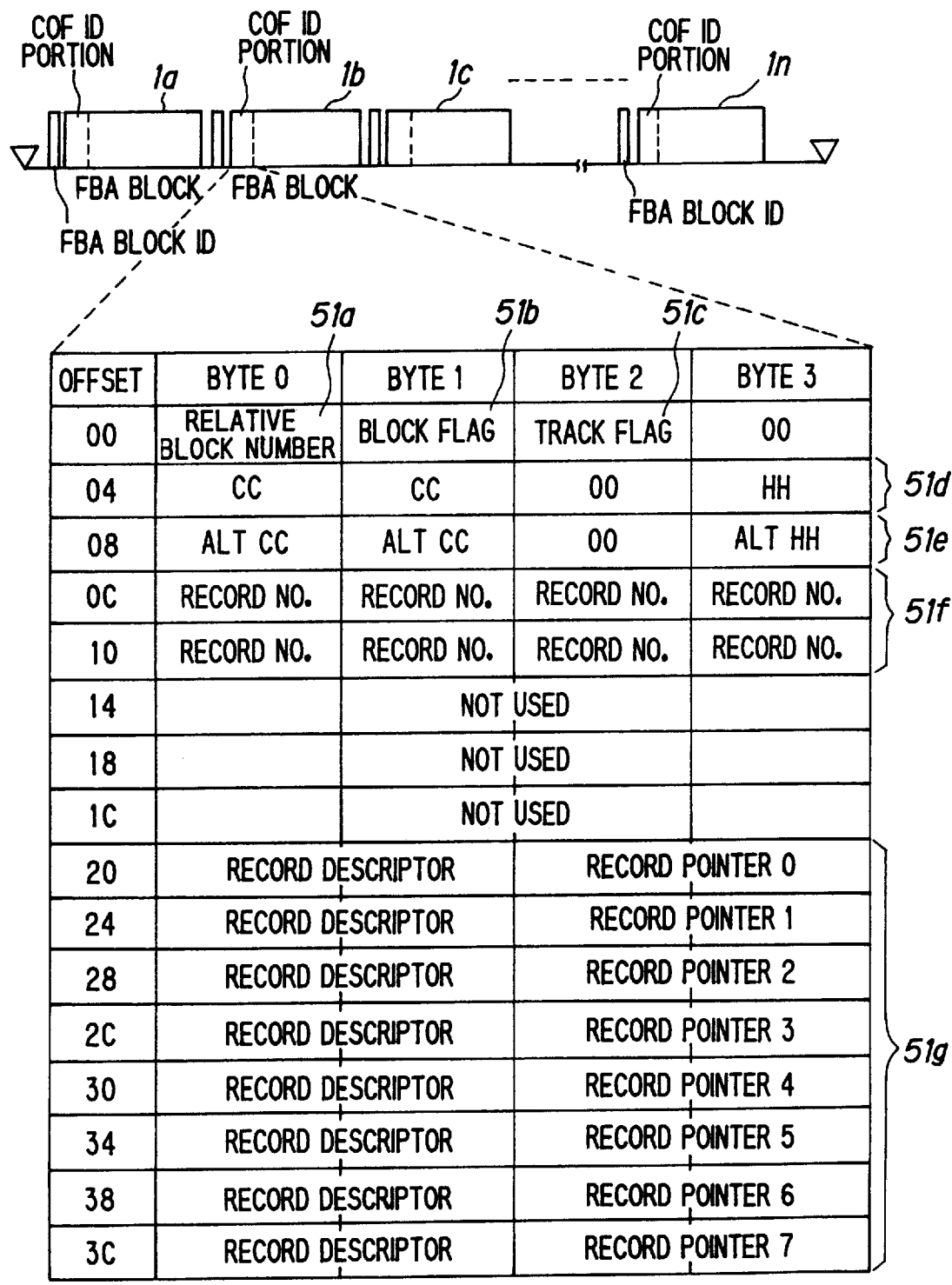
FIG. 13 is a diagram for describing the FBA format.

The items of information (1)~(7) below are recorded in the ID portion of each FBA block as shown in FIG. 13 in order to implement a COF conversion, defect/alternate track management and other processing:

(1) a relative block number 51a, from the beginning of the CKD track, of the sought FBA block;
(2) a block flag 51b which designates information specific to the FBA block (e.g., the fact that a valid record is present in this block);
(3) a track flag 51c which designates information specific to the track (e.g., whether a track is a normal track, an alternate track, a defective track, a defective alternate track, etc.);
(4) a logical address (CCHH) 51d of the CKD track to which this FBA block belongs;
(5) a logical address CCHH of a substituted CKD track (alternate track) or logical address CCHH (ALT CCHH) 51e of a defective track;
(6) the numbers 51f of individual records present in this FBA block; and
(7) information (record descriptors) of individual records present in this block, as well as record pointers (51g). Recorded as record pointers are (7-1) the number of bytes from the beginning of the FBA block to the count field of each record, (7-2) the number of bytes up to the home address portion HA, and (7-3) the number of bytes up to EOT (end of track), which indicates the end of the record group on the track.

The nine bits from the 15th to the 9th bits of a record descriptor have the meanings given below, and the other bits, namely the 8th to 0th bits, are not used or are employed in other applications.

Figure 14:
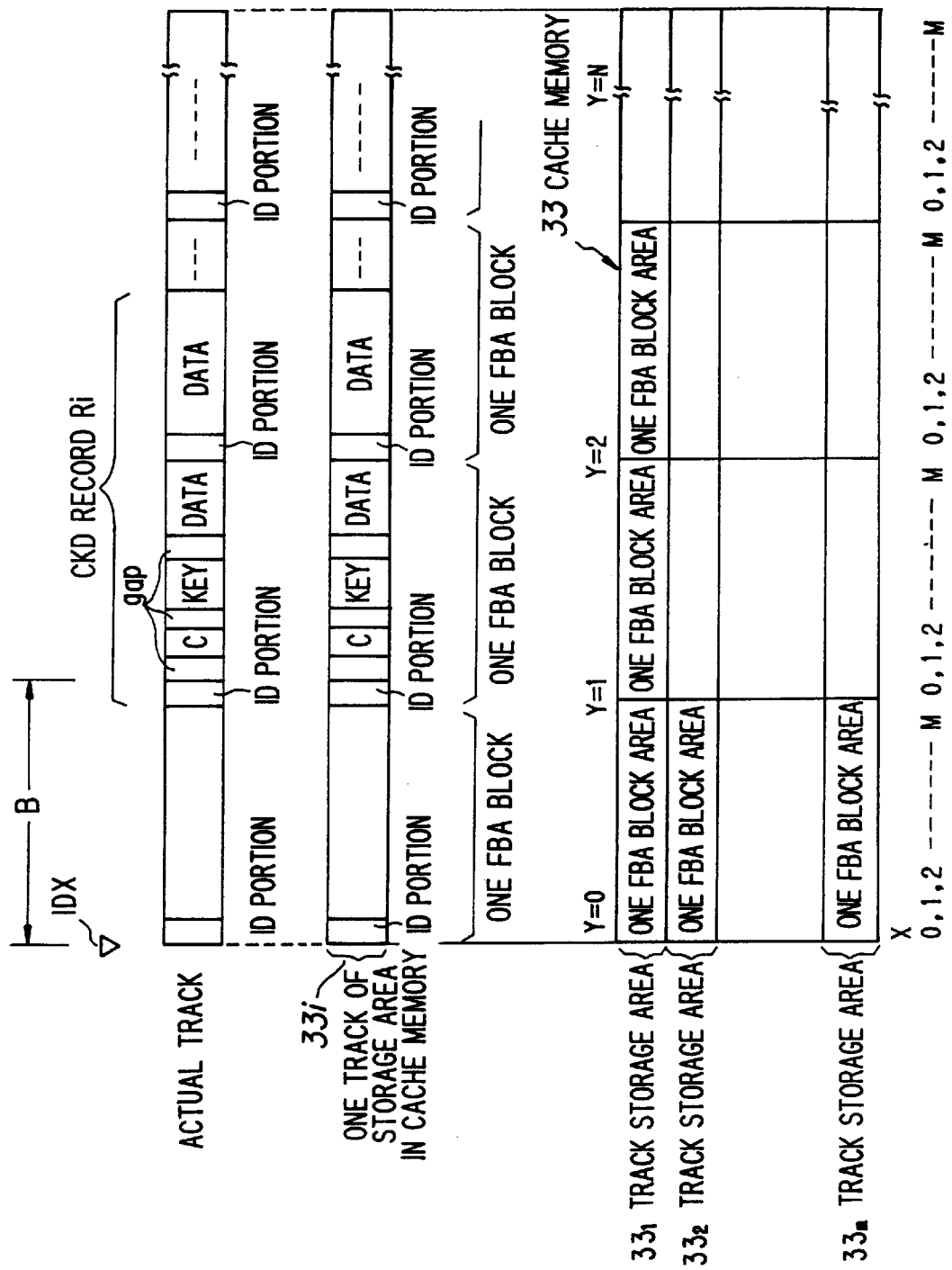
FIG. 14 is a diagram useful in describing development in a cache memory for format conversion.

15th Bit: a standard record (a record in which the values of the physical address and logical address agree)
14th Bit: an HA (home address) field
13th Bit: an EO (end of track) field
12th Bit: record is accommodated in this block 11th Bit: interrupt has occurred in writing of count portion C 10th Bit: interrupt has occurred in writing of key portion K 9th Bit: interrupt has occurred in writing of data portion D As shown in FIG. 14, the cache memory 33 has track storage areas $33_1$~$33_m$ corresponding to a plurality of physical tracks (actual tracks). Each track storage area is divided according to the FBA block size, and a block address Y is allocated to each block area. In each block area, addresses X are assigned in order at the size (=64 byte units) of the ID portion.

When the host device designates the writing of a record, the device adapter 32 reads out the content of the FBA block containing the record and develops the data in the cache memory 33. Next, the channel adapter 31 rewrites the content of the particular record stored in the cache memory 33. Thereafter, the device adapter 32 writes the FBA block containing the rewritten record in the direct-access storage device 40. When reading of a record is designated by the host device, the device adapter 32 develops the content of the FBA block containing this record in the cache memory 33 and the channel adapter 31 transfers the designated record from the cache memory to the host device.

For example, in a case where a record Ri is rewritten, assume that the position of the record Ri on an actual track is B bytes from the index IDX. In such case the record Ri is developed at a position that is B bytes from the beginning of a prescribed track storage area $33i$ in cache memory 33. Accordingly, the channel adapter 31 rewrites the content of the record Ri that starts from the B-byte position in the cache memory. Thereafter, the device adapter 32 writes this record in the direct-access storage device in FBA block units.

Further, in the record read operation, the device adapter 32 obtains the FBA block (let j represent the relative block number from the beginning of the track), which is to be developed in the cache memory 33, based upon the parameter value (sector value) designated by the set sector, and develops the data from this FBA block to the final block of the track in the cache memory 33. In this case, FBA block data is stored successively from the j-th block area onward in the prescribed track storage area $33i$. Thereafter, the channel device 31 analyzes the ID portion of the developed data and transfers only the data of the field requested by the host device to the host device.

By virtue of this method, data (a record) is divided into blocks and developed in the cache memory 33, whereby an FBA disk is subjected to a data write or read operation in FBA-block units.

The details of reading and writing data will now be described.

(c) Reading of data

Figure 15:
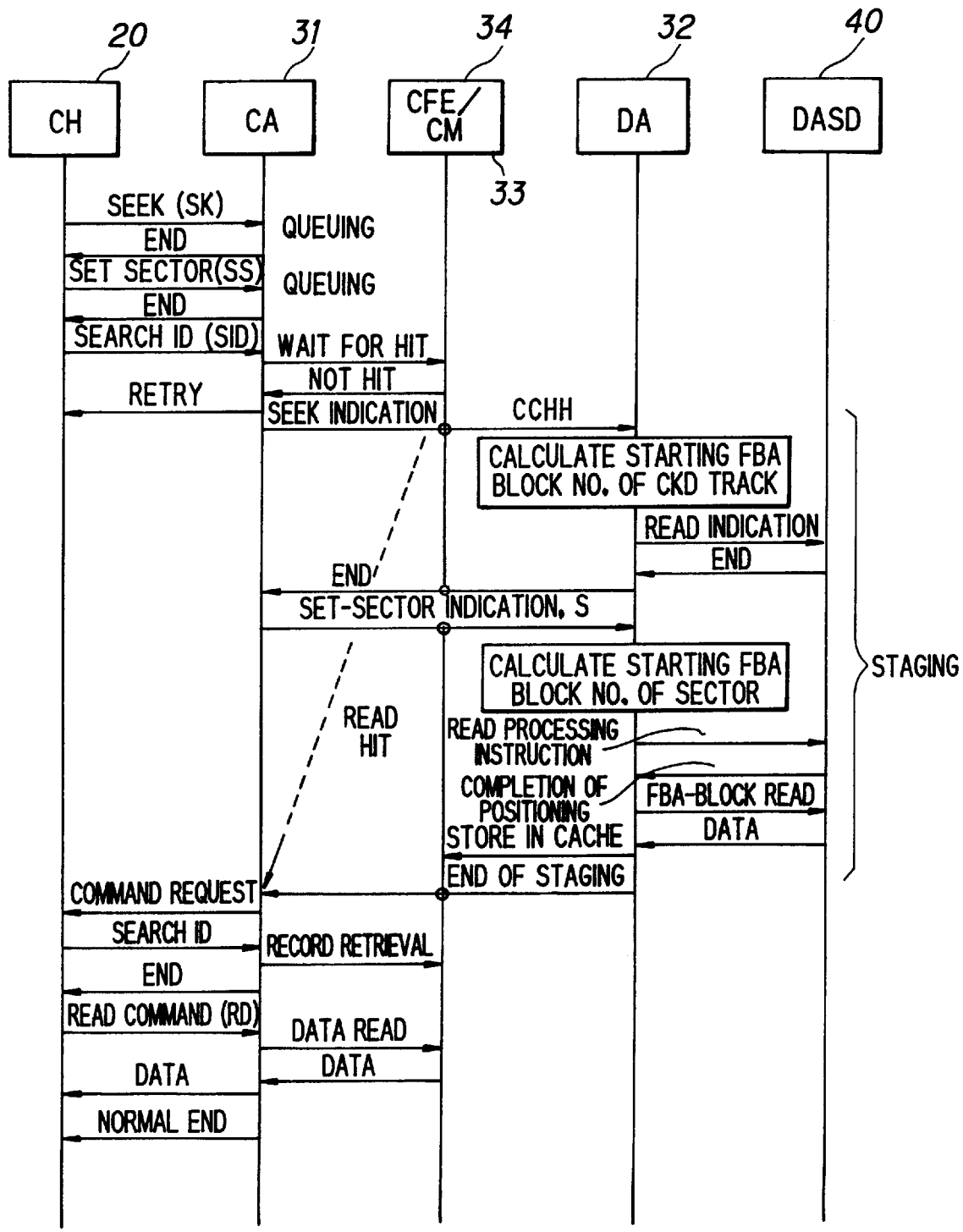
FIG. 15 is a diagram for describing a data reading procedure.

FIG. 15 is a diagram for describing the reading of data according to the present invention. The circle marks in FIG. 15 indicate that designations and "end" reports are made via the resource manager RM.

When the seek command SK is generated by the channel device 20, the channel adapter 31 queues the seek command in a command queue and subsequently sends an operation-finished signal back to the channel device 20 to make it appear that the seek operation has ended. The channel device 20 issues the set-sector command SS in response to reception of the seek operation-finished signal. When this command is received, the channel adapter 31 queues the command and then sends an operation-finished signal back to the channel device 20 to make it appear that the set-sector operation has ended. The channel device 20 issues the search ID command SID in response to reception of the set-sector operation-finished signal. When this command is received, the channel adapter 31 inquires of the cache function engine 34 whether the record of the requested address (CCHHR) is present in the cache memory 33 (hit inquiry).

If the requested record is not present in the cache memory 33 (MISS), then the channel adapter 31 notifies the resource manager 35 of this fact and issues a retry signal in order to cut off the channel device 20 from the disk control unit 30. The resource manager 35 refers to an exclusive control table ECT, which has been stored in the internal table store, to verify that the direct-access storage device 40 sought is not in the process of being accessed, determines the prescribed device adapter 32, delivers the CKD track position (CCHH) contained in the seek command and commands a seek operation. Upon receiving the seek command, the device adapter 32 calculates the number P of the head FBA block of the CKD track CCHH in accordance with the following equation:

$$P=[M \cdot (\text{number of heads})+N] \cdot B \qquad (1)$$

where M=CC (the minimum value is 0), N=HH (the minimum value is 0) and B is the number of FBA blocks contained in one CKD track.

If the number P of the head FBA block is obtained, the device adapter 32 issues a read command to the direct-access disk device 40 via an SCSI interface to read data from the head block. If a head positioning-complete signal in response to the read command is received from the direct-access disk device 40a, the device adapter 32 so notifies the channel adapter 31. As a result, the channel adapter 31 delivers the sector value (S) contained in the set-sector command to the device adapter 32 and commands the set-sector operation. Upon receiving the set-sector command, the device adapter 32 calculates the relative block number y, from the beginning of the track, of the FBA block stored in the sector designated by the equations below, as well as the block number Q of this FBA block.

$$y=S \cdot (\text{byte length of one sector})/(\text{byte length of one FBA}) \qquad (2)$$

where y represents the number of FBA blocks from the beginning of the track; and $$Y=X+[y] \qquad (3)$$

where [y] represents a whole number obtained by raising fractions.

Next, the device adapter 32 commands the direct-access disk device 40 via an SCSI interface to perform the read processing operation for reading data from the FBA block of block number Q. It should be noted that the read processing involves sending the fixed-length direct-access storage device 40 a read instruction, which contains the block number Q of the FBA block, and reading the prescribed FBA block. If a positioning-complete signal in response to the read processing command is received from the direct-access disk device 40, the device adapter 32 instructs the direct-access disk device 40 to read one CKD block of data (e.g., up to a block which contains EOT) and writes the read FBA block in the cache memory 33 (staging; see FIG. 15). At this time, the address CCHHR of the record that has been recorded in the ID portion of each FBA block is stored in the internal memory of the cache function engine 34.

If writing in the cache memory 33 has been concluded, the device adapter 32 notifies the channel adapter 31, via the resource manager, of the end of staging. As a result, the channel adapter 31 sends a command request signal to the channel device 20. Upon receiving the command request, the channel device 20 reissues the search ID command SID issued last. If the channel adapter 31 receives the search ID command SID, it retrieves the designated record in the cache memory 33 by referring to the ID information (record number and pointer) of the FBA block and sends the search ID operation-finished signal to the channel device 20 in response to end of retrieval. If the channel device 31 receives the search ID operation-finished signal, it issues the read command RD. If the channel adapter 31 receives the read command RD, it reads the searched record out of the cache memory 33 and transfers this record to the channel device 20. When the transfer operation is finished, the channel adapter 31 gives notification of status indicating normal end of operation.

If, on the other hand, the record requested by the search ID is present in the cache memory 33 (read hit), the channel adapter 31 sends a command request signal to the channel device 20 (see the dashed line in FIG. 15). Upon receiving the command request, the channel device 20 reissues the search ID command SID issued last. If the search ID command SID is received, the channel adapter 31 retrieves the designated record in the cache memory 33 by referring to the ID information and sends the search ID operation-finished signal to the channel device 20 in response to end of retrieval. If the channel device 20 receives the search ID operation-finished signal, it issues the read command RD. If the channel adapter 31 receives the read command RD, it reads the requested record out of the cache memory 33, transfers it to the channel device CH and gives notification of status indicating normal end of operation following the conclusion of the transfer operation.

(d) Writing of data

Figure 16:
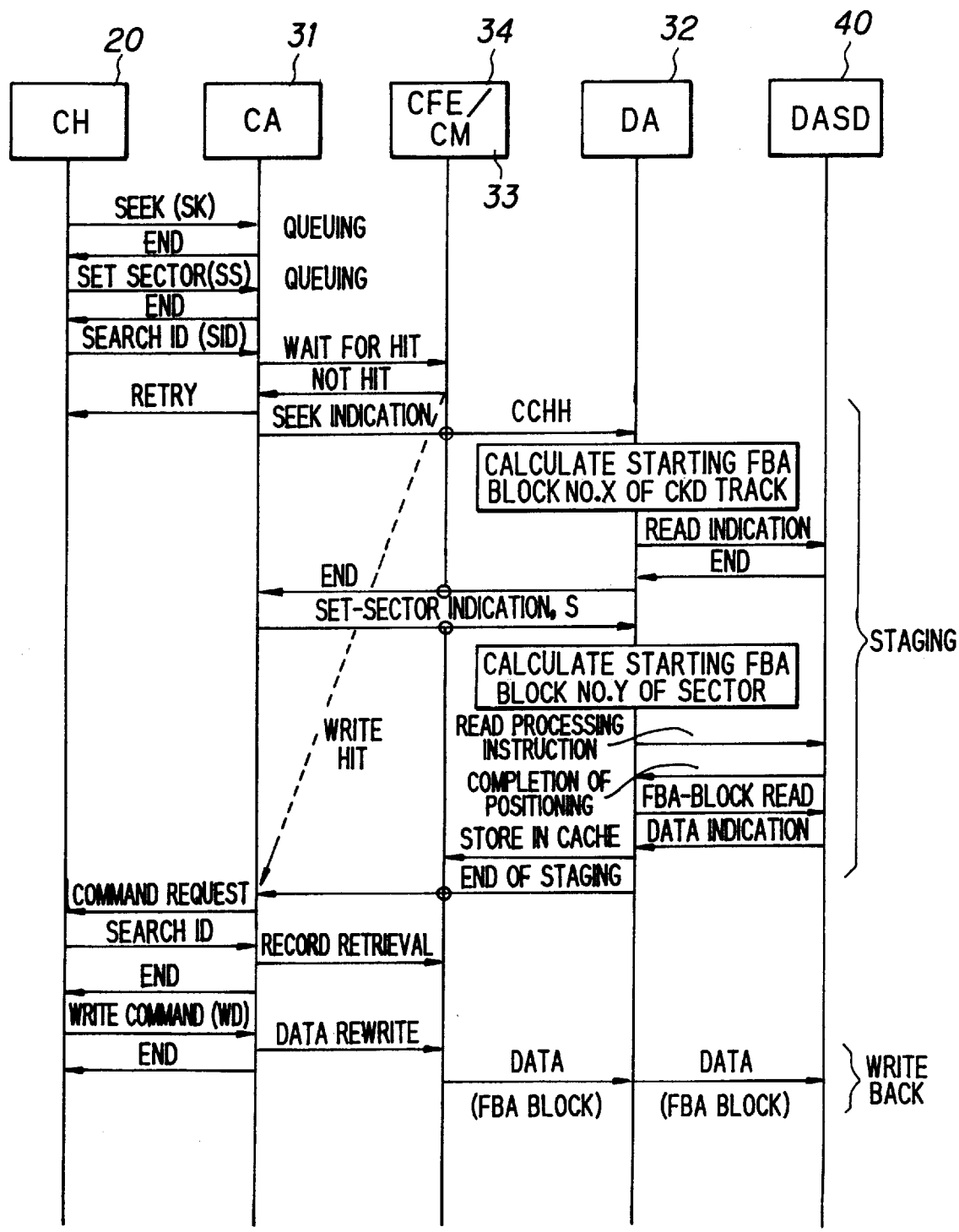
FIG. 16 is a diagram for describing a data rewrite procedure.

FIG. 16 is a diagram for describing a procedure for rewriting data.

When the seek command SK is generated by the channel device 20, the channel adapter 31 queues the seek command in a command queue and subsequently sends an operation-finished signal back to the channel device 20 to make it appear that the seek operation has ended. The channel device 20 issues the set-sector command SS in response to reception of the seek operation-finished signal. When this command is received, the channel adapter 31 queues the command and then sends an operation-finished signal back to the channel device 20 to make it appear that the set-sector operation has ended. The channel device 20 issues the search ID command SID in response to reception of the set-sector operation-finished signal. When this command is received, the channel adapter 31 inquires of the cache function engine 34 whether the record of the requested address (CCHHR) is present in the cache memory 33 (hit inquiry).

If the requested record is not present in the cache memory 33, then the channel adapter 31 notifies the resource manager 35 of this fact and issues a retry signal in order to cut off the channel device 20 from the disk control unit 30. This is followed by staging processing similar to that of FIG. 15.

If staging is concluded, the device adapter 32 notifies the channel adapter 31, via the resource manager, of the end of staging. As a result, the channel adapter 31 sends a command request signal to the channel device 20. Upon receiving the command request signal, the channel device 20 reissues the search ID command signal SID issued last. If the channel adapter 31 receives the search ID command signal SID, it retrieves the designated record in the cache memory 33 by referring to the ID information and sends the search ID operation-end signal to the channel device 20 in response to end of retrieval.

If the channel device 20 receives the search ID command signal SID, it issues the write command WD. Upon receiving the command request, the channel device CH issues the write command WD. Upon receiving the write command WD, the channel adapter 31 rewrites the searched record directly as a record accompanying the write command and notifies the channel device of the normal-end status following the rewriting operation. Further, the cache function engine CFE makes "1" the flag corresponding to the address CCHHR of the rewritten record. In concurrence with the foregoing, the write record is written in the non-volatile memory (NVS) (not shown) incorporated within the disk control unit 30. This is to prevent the content of the cache memory 33 from being erased for some reason before it is saved in the direct-access disk device 40.

Thereafter, independently of the operation of the host, the device adapter 32 reads the FBA block containing the record of CCHHR for which the flag is "1" from the cache memory 33, transfers the block to the direct-access storage device 40 and writes the block at the prescribed position (this is "write-back"). In this case, the cache function engine 34 makes the flag of the record address CHHR "0".

If, on the other hand, the record requested by the search ID is present in the cache memory 33 (write hit), the channel adapter 31 sends a command request signal to the channel device 20 (see the dashed line in FIG. 16). Upon receiving the command request, the channel device 20 reissues the search ID command SID issued last. If the channel adapter 31 receives the search ID command SID, it retrieves the designated record in the cache memory 33 by referring to the ID information of the FBA block and sends the search ID operation-end signal to the channel device 20 in response to the end of retrieval. If the channel device 20 receives the search ID end-operation signal, it issues the write command WD. From this point onward rewrite processing is executed in the same manner as set forth above.

If the arrangement described above is adopted, positioning control and data-retrieval control with regard to the seek command, set-record command and search ID command can be executed in the same manner as in the case of the CKD disk device even if the device is the FBA disk device.

Further, only the home address HA and record R0 of the CKD track are recorded in the leading FBA track. Therefore, even if the disk control unit 30 has accepted a format-write processing instruction from the host device 11 for format write from the record R1, the disk control unit 30 will not read the FBA block of HA/0 out to the cache memory 33 and will read only the FBA blocks from the record R1 onward. As a result, write processing from record R1 onward can be performed with ease in the cache memory and format-write processing can be executed at high speed. It should be noted that in a case where the data of HA/0 and the data from record R1 onward are recorded in the same FBA block, it is required that the data of HA/0 also be read out and developed in the cache memory in response to a format-write processing instruction for format write from record R1 and that only the records other than that of HA/0 be subjected to write processing. The write processing is complicated and format-write processing cannot be executed at high speed.

(e) Data-access controller

FIG. 17 is a diagram for describing data access of the cache memory.

The cache memory 33 has a plurality of track storage areas. Each track storage area 33$i$ is subdivided into areas 1$a$, 1$b$, ... 1$n$ in units of the FBA blocks, as shown in FIG. 17A, and a block address Y is assigned to each of the areas 1$a$, 1$b$, ... 1$n$. Each subdivided area is assigned with internal addresses X in regular order in units of the size (64 bytes) of the ID portion. The ID portion is stored in the leading 64 bytes (internal address X=0) of each block. At the time of a write or read operation with respect to the cache memory 33, the channel adapter 31 designates the block addresses Y and the address X within a subdivided area. For example, if a record Ri has been written from address $X_0$ of the second FBA block area 1b (block address Y=2) of track storage area 33i to the third block area 1c (block address Y=3), as shown in FIG. 17B, then, at the time of read or write of record Ri, the channel adapter 31 enters the block addresses 2, 3 and the internal address $X_0$ into the data-access controller 39. On the basis of these addresses, the data-access controller 39 accesses the cache memory 33 and reads/writes the record Ri.

Figure 18:
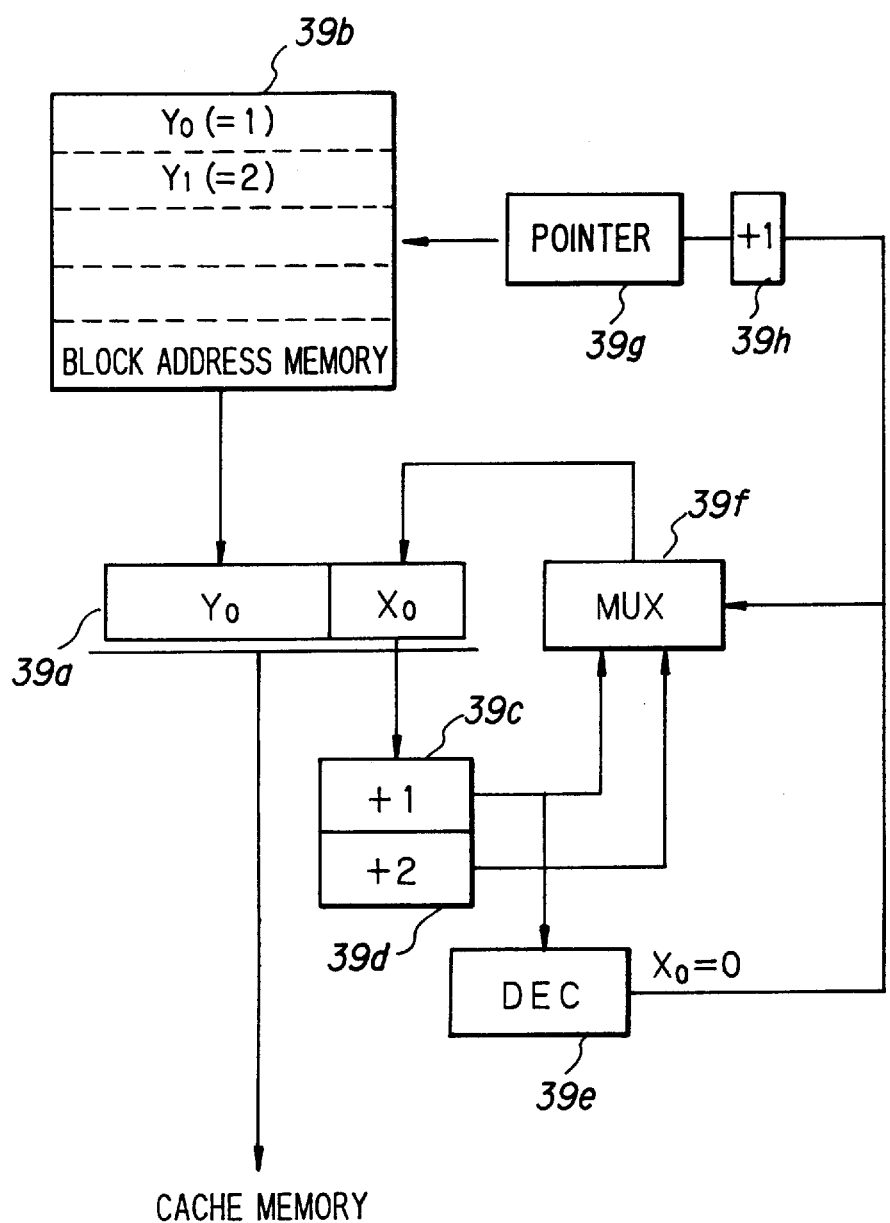
FIG. 18 is a diagram showing the construction of a data-access controller.

FIG. 18 is a diagram showing the construction of the data-access controller 39. The controller includes an address register 39a in which the block address $Y_0$ and internal address $X_0$ are set. The internal address X0 is set at lower-order n bits, and the block address Y0 is set at higher-order bits. The number ($2^n$) of addresses expressed by the lower-order n bits is equivalent to the size of the block area. A block address memory 39b stores the block addresses of all block areas to be read out. A +1 incrementer 39c increments ($X_0+1 \rightarrow X_0$) the internal address $X_0$ whenever data having a size (64 bytes) the same as that of the ID portion is read from or written to the cache memory 33. A +2 incrementer 39d increments ($X_0+2 \rightarrow X_0$) the internal address $X_0$ whenever 64-byte data is read from or written to the cache memory 33. A decoder 39e is for determining whether the internal address $X_0$ outputted by the +1 incrementer 39c is 0 or not, namely whether the. portion accessed next is an ID portion.

Numeral 39f denotes a multiplexer. The multiplexer 39f sets the internal address $X_0$ from the +1 incrementer 39c to the lower-order n bits of the address counter 39a in a case where $X_0 \neq 0$ holds and sets the internal address $X_0$ from the +2 incrementer 39d to the lower-order n bits of the address counter 39a in a case where $X_0=0$ holds. A pointer 39g initially points to the starting address of the block address memory 39b and is then incremented whenever read/write of one block area is completed, thereby pointing to the next address. A +1 incrementer 39h increments the content of pointer 39g whenever read/write of one block area is completed, namely whenever $X_0=0$ is established.

At the time of writing to or reading from the memory 33, the channel adapter 31 or device adapter 32 designates (1) block addresses (in a case where the operation extends over a plurality of blocks, the respective block addresses) $Y_0, Y_1$, . . . and (2) the address $X_0$ within the area designated by the starting block address $Y_0$. The block addresses $Y_0, Y_1, \ldots$ are stored in the block address memory 39b, and the internal address $X_0$ is set at the lower-order n bits of the address register 39a. Since the pointer 39g initially points to the starting address of the block address memory 39b, the block address data $Y_0$ that has been stored at this starting address is read out and set at the higher-order bits of the address counter 39a.

As a result, the cache memory 33 is accessed based upon the address that has been set in the address counter 39a. When read/write of 64 bytes of data is completed, the +1 incrementer 39c and the +2 incrementer 39d increment the internal address $X_0$ by +1 and +2, respectively. The decoder 39e checks to determine whether the output $X_0$ or the +1 incrementer 39c is 0 or not.

If $X_0=0$ does not hold, the multiplexer 39f sets the internal address $X_o$, which has been incremented by +1, at the lower-order n bits of the address counter 39a and imple- ments read/write of the next 64 bytes of data. The same processing is then repeated. If $X_0=0$ is attained, the multiplexer 39f sets the internal address $X_0$, which has been incremented by +2, at the lower-order n bits of the address counter 39a. Further, the counter 39g is incremented and points to the second address. As a result, the address $Y_1$ of the next block area is set at the higher-order bits of the address counter 39a.

As a result, read/write of data is performed from the second address of the next block area and the ID portion is skipped. In other words, records can be written to or read from the cache memory consecutively irrespective of the presence of an ID portion.

Thus, when records spanning a plurality of FBA blocks are read out of the cache memory 33 or written to the cache memory, the data-access controller 39 skips the ID portion placed at the beginning of each FBA block and writes the records to or reads them from the cache memory.

(f) Read/write processing using write-interruption flag

As described above with reference to FIG. 13, the ID portion of each FBA block is provided with an area, for every field (COUNT field, KEY field, DATA field) of each record, which stores a flag indicating whether write processing from the host device 11 has been interrupted or not. In other words, whether an interruption has occurred during writing of a DATA field, during writing of a KEY field or during writing of a COUNT field is stored at the 9th through 11th bits of the descriptor of each record. Using the interruption flag makes it possible to perform control in such a manner that the data of the field in which the interruption occurred will not be transferred to the host device.

Figure 19:
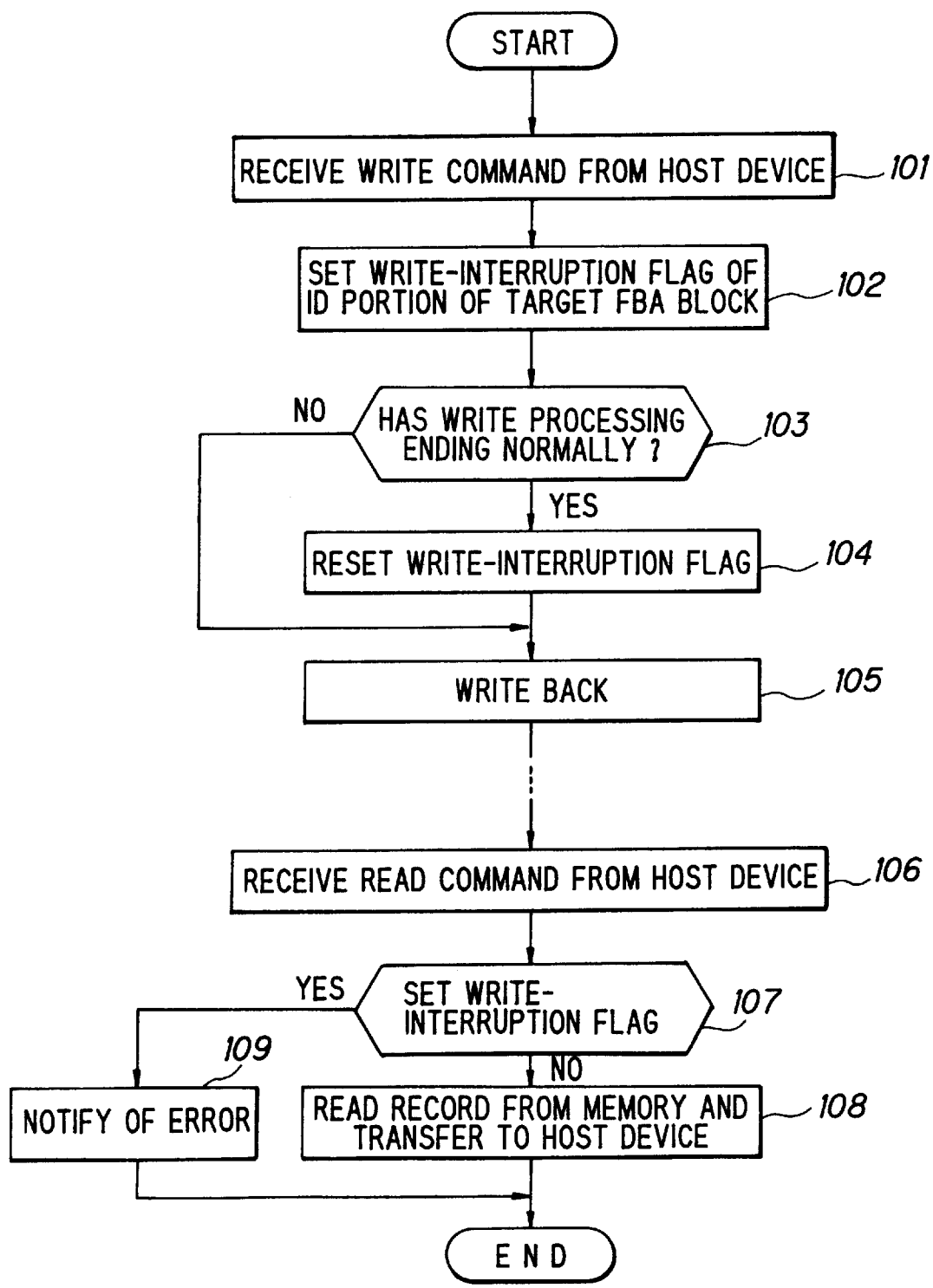
FIG. 19 shows a read/write processing flow using a write interruption flag.

FIG. 19 is a flowchart of read/write processing using the write-interruption flag.

Upon receiving a write command, from the host device, for the COUNT field, KEY field and DATA field of a prescribed record (step 101), the channel adapter 31 sets to "1" the interruption flag of the ID portion that has been stored at the beginning of the sought FBA block in cache memory 33 (step 102).

Next, the channel adapter 31 performs monitoring to determine whether write processing has ended normally (step 103). If rewriting of the COUNT field of the record has ended normally, the channel adapter resets the interruption flag of this COUNT field to "0". If rewriting of the KEY field of the record has ended normally, the channel adapter resets the interruption flag of this KEY field to "0". If rewriting of the DATA field of the record has ended normally, the channel adapter resets the interruption flag of this DATA field to "0" (step 104). However, in a case where system reset or selective reset is accepted from the host device 10 and write processing is interrupted during the writing of a prescribed field, the channel adapter 31 does not reset the interruption flag. As a result, in a case where processing is interrupted during a write operation, the device adapter 32 writes back the data in the cache memory to the direct-access storage device 40 in FBA block units with the flag being maintained in the set state (step 105).

In a case where a READ instruction for the prescribed field of a prescribed record has been received from the host device 10 under these conditions, the device adapter 32 reads out the FBA block containing this record and sends it to the cache memory 33 (step 106).

The channel adapter 31. determines whether the interruption flag of this field in the ID portion at the beginning of the FBA block containing the commanded record has been set (step 107). If the interruption flag has not been set, i.e., if write interruption is not being indicated, the data of this field is read out of the cache memory 33 and transferred to the host device (step 108). If the interruption flag has been set, i.e., if write interrupt is being indicated, the data of this field is not transferred to the host device 11 and a signal notifying of an error is transmitted (step 109). Thus, the fact that writing of data has been interrupted can be recognized and it is possible to prevent transfer of erroneous data in response to a READ processing instruction.

(g) Monitoring of status of direct-access storage device

There are direct-access storage devices which do not have a function for notifying the disk control unit 30 of attainment of the ready state when a transition is made from the disabled state (not ready) to the enabled state (ready) in response to the introduction of power. Accordingly, the disk control unit 30 executes monitoring of such direct-access storage devices in accordance with the processing flow shown in FIG. 20.

The storage portion of the device adapter 32 is provided with a status monitoring table CMT shown in FIG. 21. Logical addresses (machine numbers) of the respective direct-access storage devices are stored in the table, and stored so as to correspond to each logical address are an indication of whether monitoring of the ready state is necessary or not as well as the status (ready or not ready) of the device.

The device adapter 32 performs monitoring to determine whether all direct-access storage devices requiring monitoring of the ready state have attained the ready state (step 201). If all have not attained the ready state, the device adapter 32 periodically sends a TEST UNIT READY command to the direct-access storage devices that are not ready (step 202). The device adapter 32 checks for a response to this command (step 203). If there is a response, the device adapter 32 enters READY in the status row of the particular machine number in the table CMT (step 204) and returns to the beginning of the flow to repeat processing. If a response is not received upon elapse of a prescribed period of time (NO at step 205), the device adapter repeats processing from the beginning of the flow without updating the status monitoring table CMT. If all direct-access storage devices requiring monitoring of the ready state are found by this monitoring processing to have attained the ready state, then the device adapter ends monitoring processing.

As a result of the foregoing operation, the disk control unit 30 is capable of readily recognizing transition from the not-ready state to the ready state even if a direct-access storage device not having a ready-state notification function is connected as a subordinate.

(h) Generation of HA/0

The first FBA block at the beginning of a track is not read out to the cache memory 33 as long as a read/write instruction of the home address HA or record R0 is not commanded. After the data from record R1 onward has been developed in the cache memory 33 and read/write of a prescribed record has been carried out, there are cases where the host device issues an HA/0 read command in order to verify the track to which this read/written record belongs. In such cases, reading out HA/0 portion to the cache memory 33 from the direct-access storage device requires considerable time.

If it is known that HA/0 has the standard format, HA/0 can be generated internally and transferred to the host device to shorten access time. Accordingly, a flag indicating whether the HA/0 portion has the standard format is stored beforehand in the buffer BF of the cache-memory management unit 34 so as to correspond to the direct-access storage device. When read HA/0 is commanded, reference is made to the standard-format flag and HA/0 is generated internally and transferred to the host device.

Figure 22:
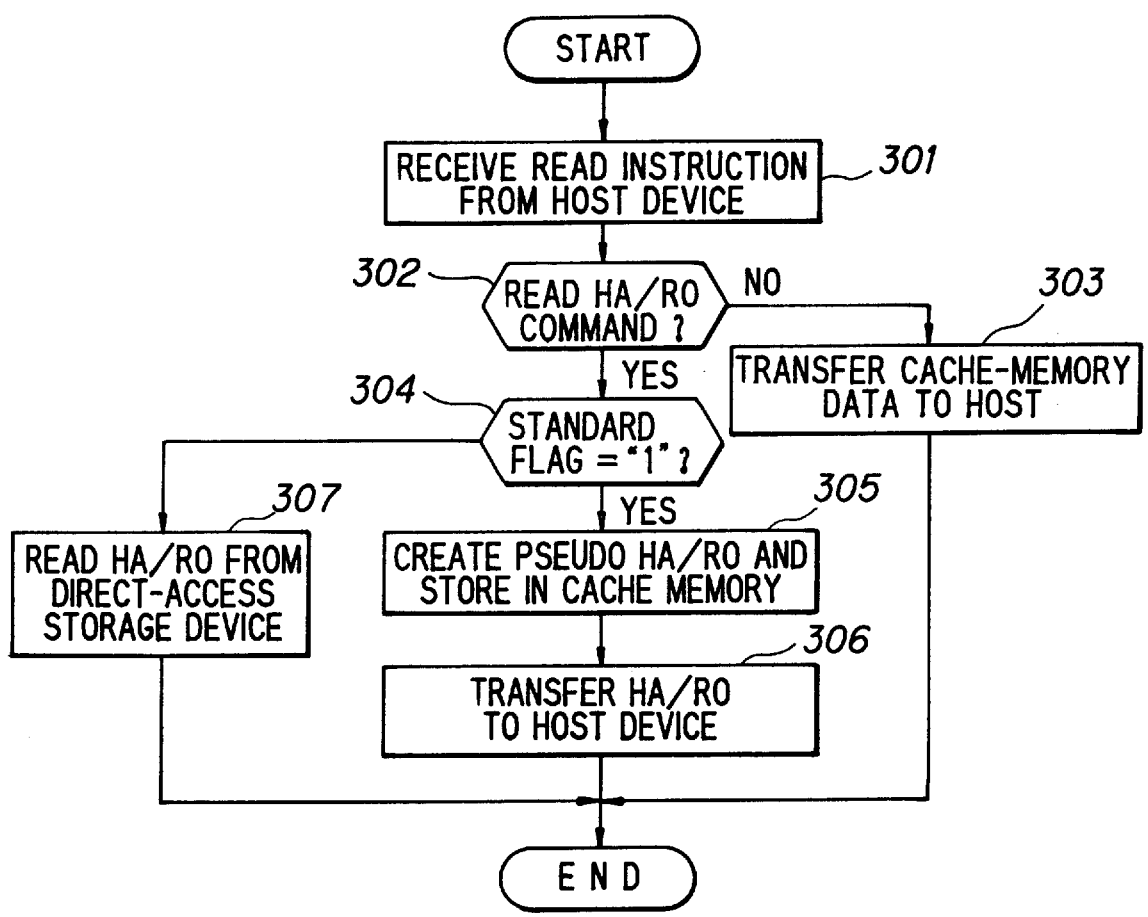
FIG. 22 shows a read HA/Rb 0processing flow.

FIG. 22 is a processing flowchart of read HA/0. Upon receiving the read command from the host device (step 301), the channel adapter 31 checks to determine whether the command is the HA/0 read command (step 302), retrieves the record of interest in the cache memory 33 and transfers it to the host device if the command is not the HA/0 read command (step 303).

If the command is the HA/0 read command, however, the channel adapter 31 checks to see whether the standard-format flag is "1" or not (step 304). If the standard-format flag is "1", the channel adapter 31 generates the pseudo HA/0 internally, stores it in the corresponding block area of the cache memory 33 and transfers it to the host device (steps 305, 306). More specifically, from among the FBA blocks that have been developed in the cache memory 33, the channel adapter 31 obtains the track address (CCHH) from the ID portion of an FBA block on the same track as that of HA/0, which is the object of the read command, uses this track address to generate the pseudo HA/0 and transfers the latter to the host device.

If the standard-format flag is "0", however, the device adapter 32 reads out the FBA block containing HA/0 and sends it to the cache memory 33, after which the channel adapter 31 transfers this HA/0 to the host device (step 307).

Thus, in a case where the HA/0 portion has the standard format, FBA blocks in which the HA/0 portions have been recorded need not be read out one by one from the direct-access storage device. This makes it possible to transfer HA/0 to the host device at high speed.

(i) Write-back of consecutive tracks to direct-access storage device

In the case of this invention, in which the leading FBA block is constructed solely by the HA/0 portions, development in the cache memory 33 starts from record R1. Consequently, in a case where records on a plurality of consecutive tracks have been developed in the cache memory 33, a discontinuous state in which the leading FBA blocks have been omitted is attained. Writing from the device adapter 32 to the FBA direct-access storage device 40 is performed by designating (1) the FBA block at which writing is to start and (2) the number Bn of write blocks. Therefore, in a case where FBA blocks extending consecutively over a plurality of tracks are written back to this direct-access storage device, write-back is performed by a single SCSI write command if the leading FBA blocks have been omitted. Accordingly, in a case where the HA/0 portions have the standard format, the channel adapter 31 creates the HA/0 portions of each track internally and stores them in the leading block area of each track storage area 33i in the cache memory 33, thereby maintaining the continuity of the FBA blocks of each track. If this arrangement is adopted, consecutive FBA blocks extending over a plurality of tracks can be written back continuously by a single write command.

Figure 23:
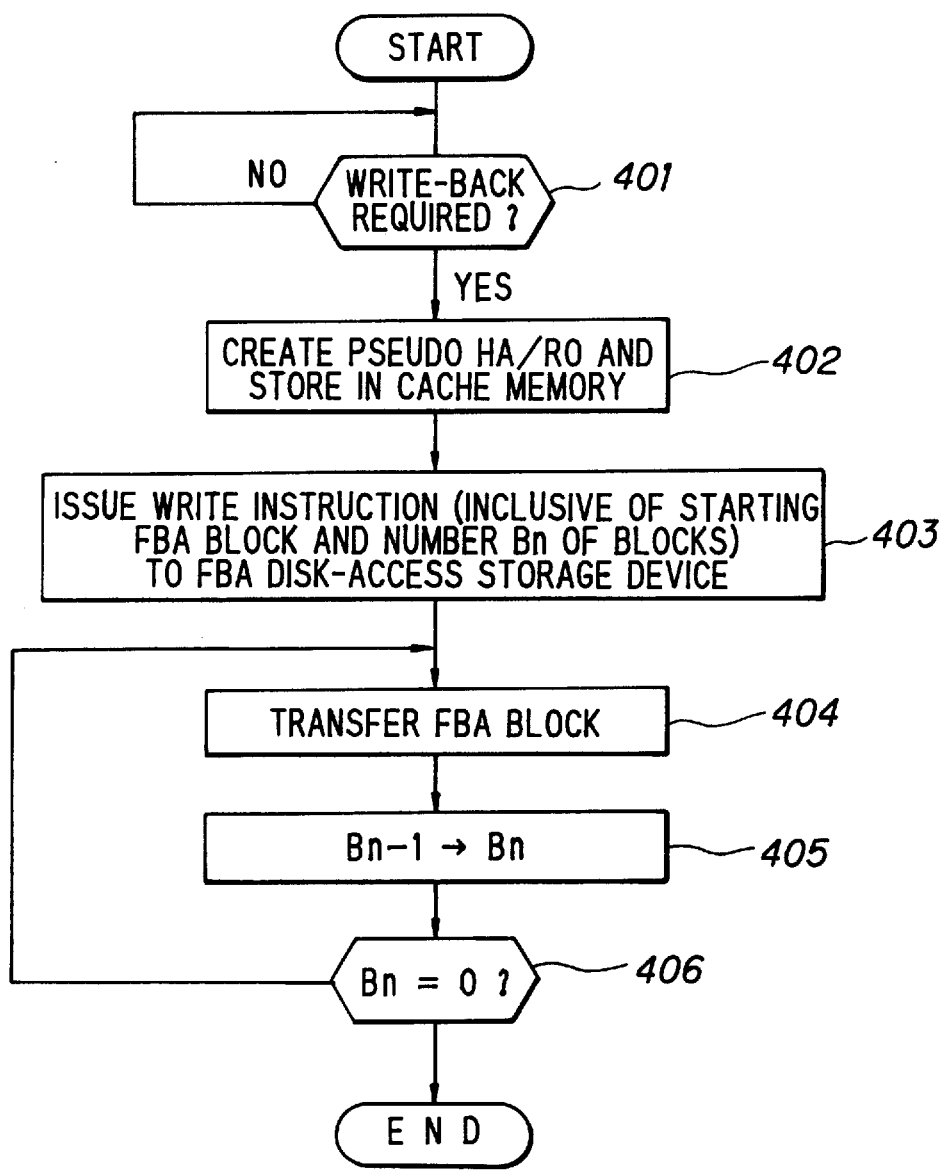
FIG. 23 shows a continuous-track write-back processing flow.

FIG. 23 is a flowchart showing processing for writing consecutive tracks. When write-back of data in the cache memory becomes necessary (step 401) and the HA/0 portions have the standard format, the channel adapter 31 generates the pseudo HA/0 of each track internally and stores the same in the leading block area of each track storage area 33i (FIG. 14) in the cache memory 33 (step 402). As a result, the continuity of the FBA blocks on each track is maintained.

Next, the device adapter 32 issues a command inclusive of the FBA block at which writing is to start and the number Bn of write blocks (step 403) and starts write-back to the direct-access storage device (step 404). Whenever one FBA block is written, the device adapter 32 decrements the number Bn of write blocks (Bn−1→Bn) (step 405), performs monitoring to determine whether Bn=0 holds (step 406) and repeats processing from step S404 onward until Bn=0 is attained.

Thus, since the continuity of the FBA blocks can be maintained over a plurality of tracks, the records in the cache memory can be written back collectively on a plurality of tracks in successive fashion so that the memory can be exploited effectively.

(j) Control of defective and alternate tracks

The defect/alternate table DAT is provided in the cache-memory management unit 34. As shown in FIG. 24, the defect/alternate table DAT stores, for each direct-access storage device, the correspondence between the track addresses CCHH of defective tracks and the track addresses CCHH of their alternative tracks. When the defect/alternate table DAT is thus provided, accessing of the direct-access storage devices can be performed efficiently.

Figure 25:
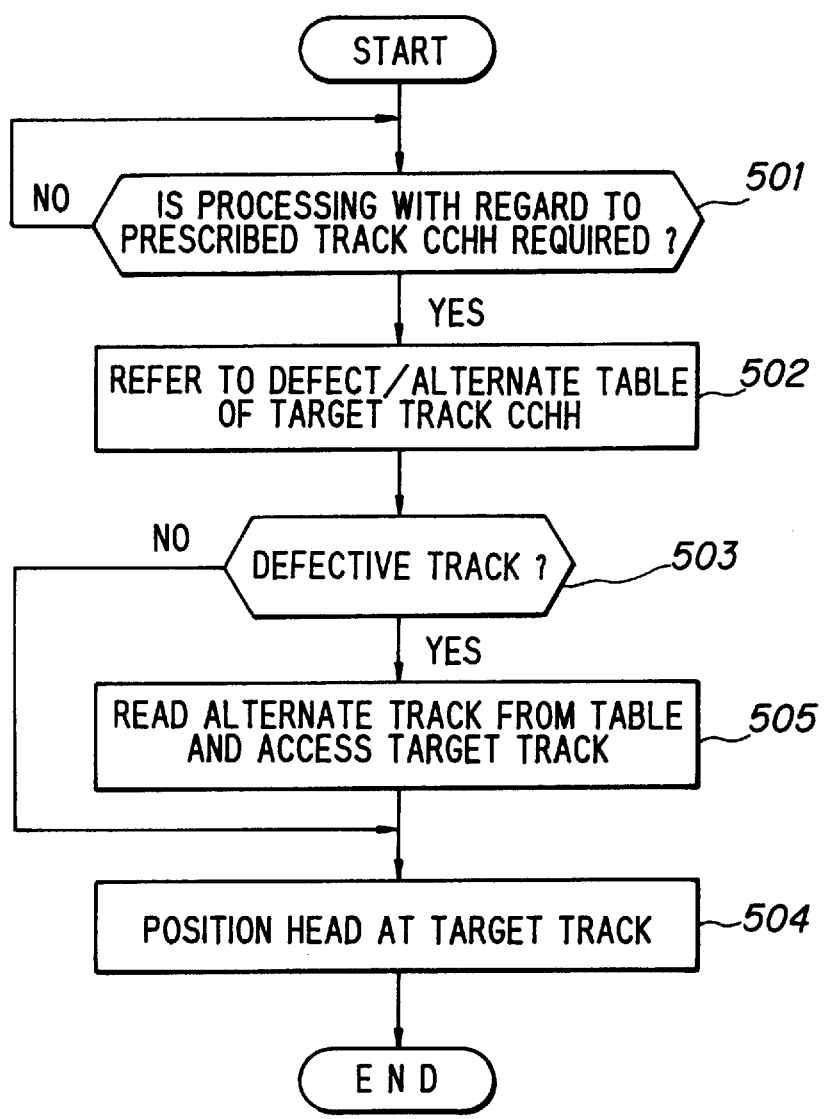
FIG. 25 shows a processing flow using the defective-track/alternate-track table.

FIG. 25 is a flowchart of processing for a case where defective and alternate tracks exist. The device adapter 32 performs monitoring to determine whether it is necessary to position the head at a prescribed track by a seek command, write-back, etc. (step 501). If positioning is required, the device adapter 32 refers to the defect/alternate table DAT (step 502) and checks to see whether the track of interest is a defective track (step 503). If the track is not a defective track, the head is positioned at the commanded track (step 504). If the track is found to be a defective track at step 503, then the device adapter 32 obtains the track that is the alternate of this defective track from the table DAT, adopts this alternate track as the track of interest (step 505) and subsequently positions the head at the track of interest, namely at the alternate track (step 504).

Thus, instead of accessing a defective track, the alternate track can be accessed directly to make high-speed access possible.

(k) Generation of defect/alternate table

When power is cut off or a reset operation is performed, the defect/alternate table DAT is cleared. This means that it is necessary to generate the defect/alternate table DAT after the introduction of power or after a reset operation.

Figure 26:
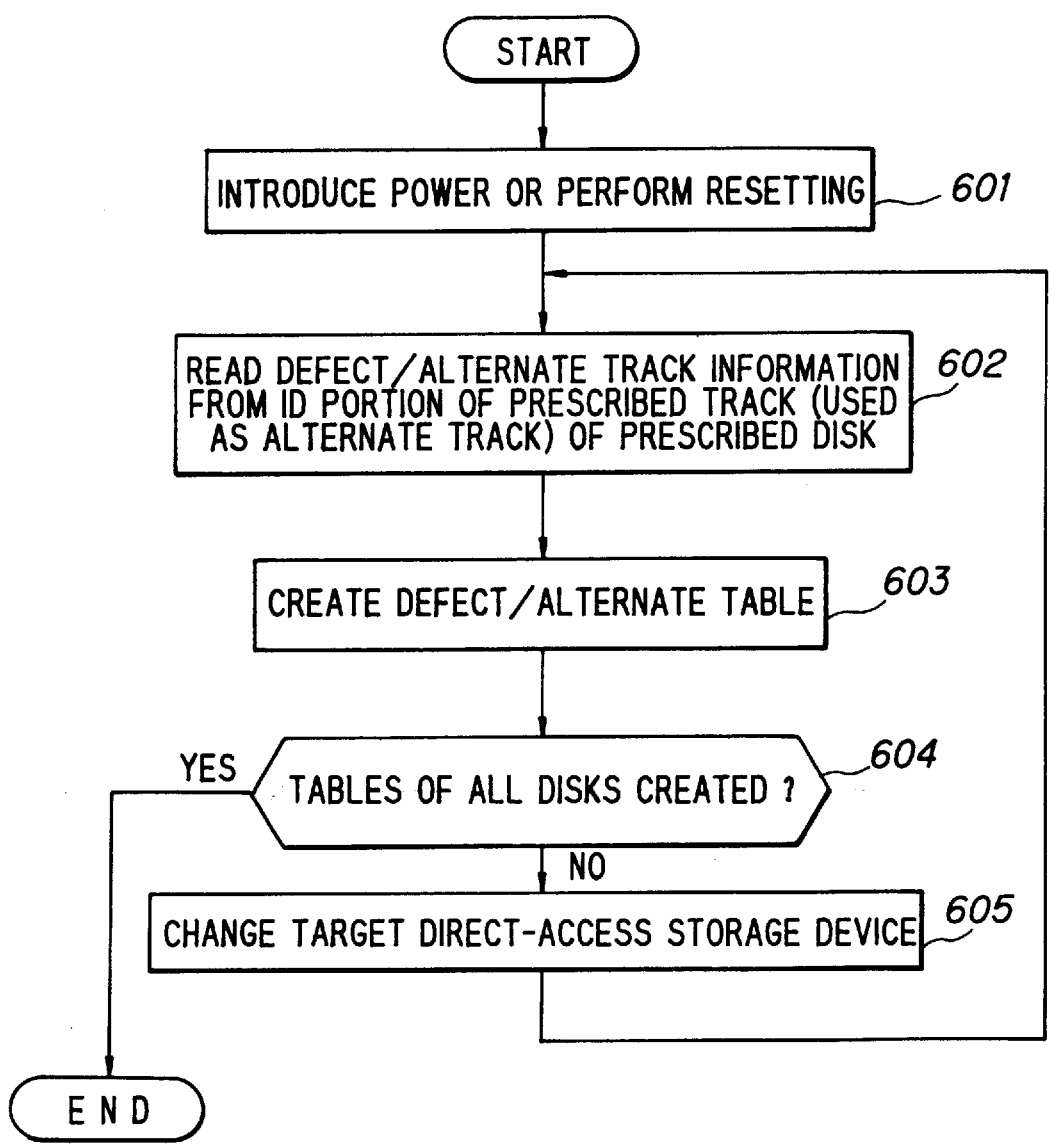
FIG. 26 shows a processing flow for generating the defective-track/alternate-track table.

FIG. 26 shows a flowchart of processing for generating the defect/alternate table.

In each direct-access storage device, a track (cylinder) used as an alternate track is decided in advance. (1) A flag indicating whether a track is actually being used as the alternate track of a defective track and (2), if the track is actually being used as the alternate track of a defective track, the track address of this alternate track and the track address of the defective track are registered in the ID portion of the leading FBA block of each track.

After power is introduced or a resetting operation performed, the device adapter 32 reads the ID portion that has been recorded in the leading FBA block of each track of the cylinder and notifies the cache function engine 34 of the track address of the alternate track and of the track address of the defective track (steps 601, 602). As a result, the cache function engine 34 creates the defect/alternate table DAT using the track addresses of the defective and alternate tracks of which it has been notified (step 603). Next, it is determined whether defect/alternate tables for all direct-access storage devices have been created (step 604). If defect/alternate tables for all direct-access storage devices have been created, then processing for creating these tables is terminated. If defect/alternate tables for all direct-access storage devices have not been created, the sought direct-access storage device is changed (step 605) and processing from step 602 onward is executed.

If this arrangement is adopted, the defect/alternate table DAT can be created even if power is cut off or even if a defect/alternate table is reset.

(1) Updating of defect/alternate table

Figure 27:
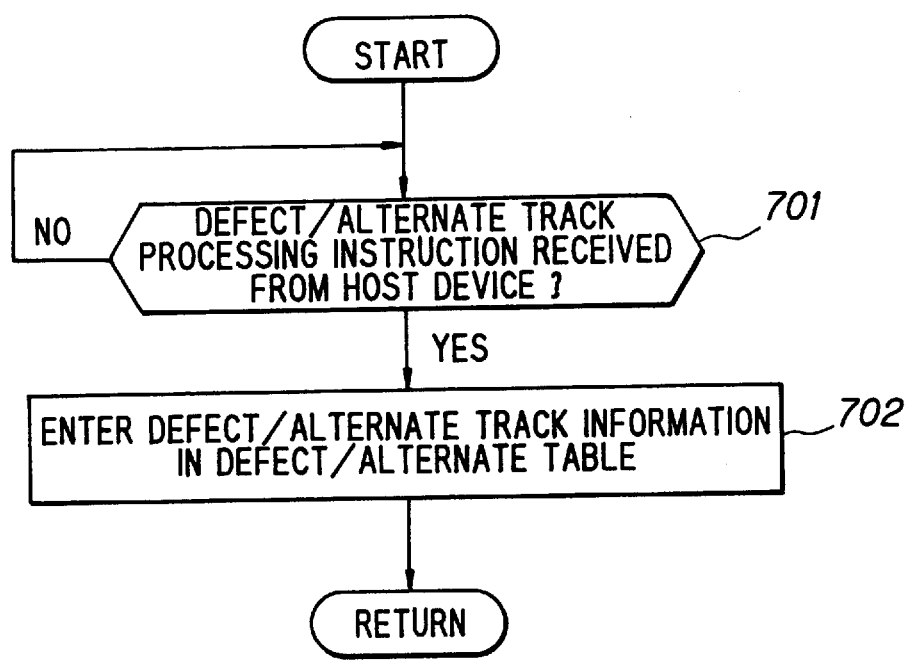
FIG. 27 shows a processing flow for updating the defective-track/alternate-track table.

The defect/alternate table DAT must be updated so as to possess the latest information at all times. FIG. 27 is a flowchart of processing for updating the defect/alternate table DAT.

When a defective track has been discovered, the host device is so notified and issues a defect/alternate processing instruction for the purpose of writing defect/alternate track information in the ID portion of the FBA block of the defective track. Accordingly, the channel adapter 31 performs monitoring to determine whether the defect/alternate processing instruction has been received from the host device (step 701). If the defect/alternate processing instruction has been received, the channel adapter 31 notifies the cache function engine 34.

In response to notification, the cache function engine 34 inserts the defective track address and the alternate track address indicated by the defect/alternate processing instruction into the defect/alternate table DAT, thereby updating the table (step 702). If this arrangement is adopted, the latest correspondence between defective and alternate tracks is stored in the defect/alternate table DAT at all times, as a result of which the alternate tracks can be addressed at high speed.

(m) Defect/alternate control when defect/alternate table is incomplete

It is so arranged that the new correspondence between defective racks and alternate tracks is entered into the defect/alternate table DAT based upon the defect/alternate processing instruction. However, there are occasions where this entry processing fails.

Figure 28:
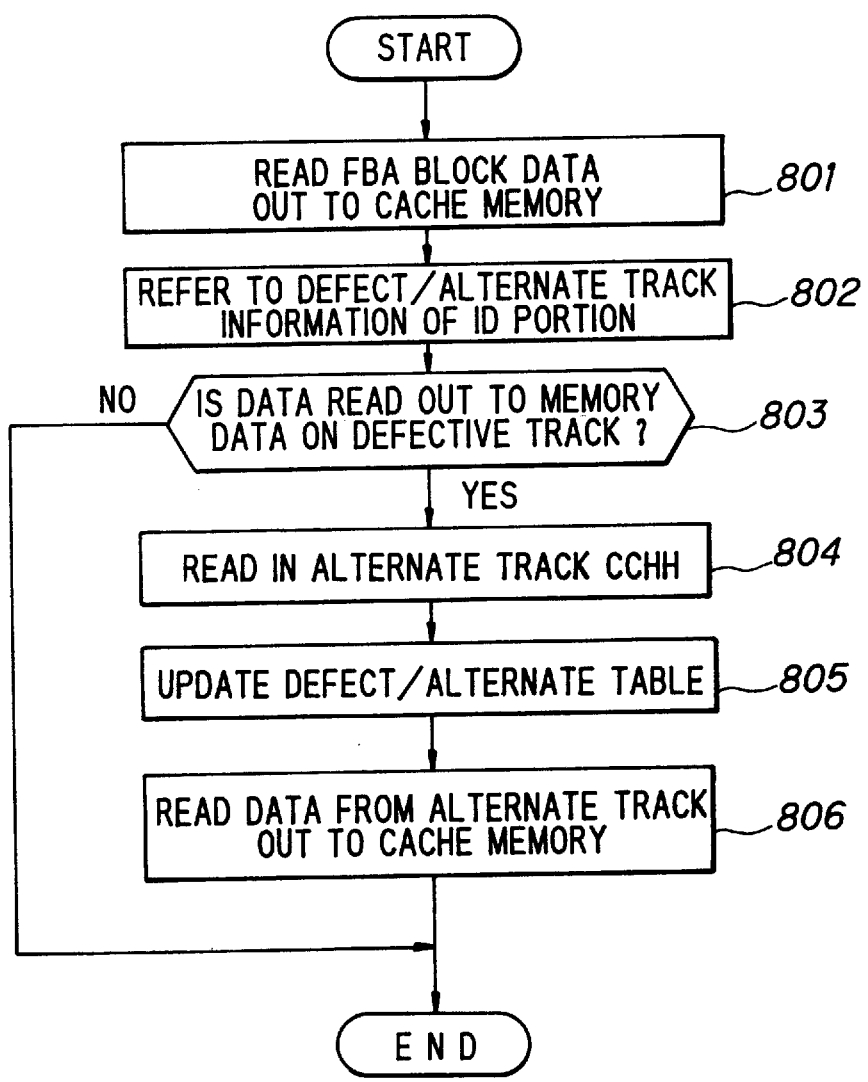
FIG. 28 shows a processing flow for a case in which the defective-track/alternate-track table is incomplete.

FIG. 28 shows a flowchart of processing for a case in which the defect/alternate table is incomplete. It is assumed that (1) the flag indicating whether a track is normal/defective and (2), in case of a defective track, the track address of the alternate track have been stored in the ID portions of all FBA blocks.

In response to a read command or write command from the host device, the device adapter 32 reads a prescribed FBA block out to the cache memory 33 (step 801). Next, the channel adapter 31 refers to the defect/alternate track information of the ID portion in the FBA block read (step 802) and determines whether the data that has been read out to the cache memory is the data of the defective track (step 803). If the data is data that has been read from a normal track, then ordinary processing is executed from this point onward.

On the other hand, the data in the cache memory is data that has been read from a defective track, the channel adapter reads in the alternate track address CCHH of the defective track from the ID portion (step 804), enters it into the defect/alternate table DAT (step 805), positions the head at the alternate track and reads the necessary data out to the cache memory 33, where this data is developed.

If this arrangement is adopted, data can be read out to the cache memory from an alternate track and processed even in a case where updating of the table DAT based upon the defect/alternate processing instruction from the host device has failed. Moreover, the defect/alternate table DAT can be updated.

Thus, in accordance with the present invention as described above, positioning control and data retrieval control with regard to a seek command, set-sector command and search ID command can be performed just as in the case of a CKD disk device even if the device is an FBA disk device. Further, only the home address HA and record R0 of the CKD track are recorded in the leading FBA track. Therefore, even if the disk control unit has accepted a format-write processing instruction from the host device for format write from the record R1, the FBA block of HA/0 will not be read out to the cache memory; only the FBA blocks from the record R1 onward will be read out. As a result, write processing from record R1 onward can be performed in the cache memory in simple fashion and format-write processing can be executed at high speed.

In accordance with the present invention, it is so arranged that a flag indicating whether write processing from the host device has been interrupted or not is recorded in the ID portion of the FBA block for every field (COUNT field, KEY field, DATA field) of each record. As a result, by referring to the flag at readout of a record, it is possible to identify the field in which the writing of data was interrupted so that erroneous data will not be transferred to the host device in response to a READ processing instruction.

In accordance with the present invention, when a record extending over a plurality of FBA blocks is read out of the cache memory or written to the cache memory, the record is read out or written in while skipping the ID portion placed at the beginning of each FBA block. As a result, even if a record requested by the host device has a size larger than that of one FBA block and extends over a plurality of FBA blocks, the record can be written in the cache memory continuously or read out of the cache memory continuously regardless of the presence of the ID portion in each block.

In accordance with the present invention, a command for retrieving the disk status is issued periodically and the fact that a direct-access storage device has attained the ready state is recognized based upon whether the direct-access storage device has responded to the command. As a result, even if a direct-access storage device not having a ready-state notification function is connected as a subordinate, it is possible to recognize the transition from not ready to ready with certainty.

In accordance with the present invention, a flag indicating whether the home address HA and record R0 have the standard format is stored in a buffer. When an instruction for reading in the home address HA and record R0 of a prescribed track has been issued by the host device, the home address HA and record R0 (a pseudo HA/0) are created internally and transferred to the host device. Thus, even if a read instruction for the HA/0 portions has been issued by the host device with regard to a track developed in the cache memory starting from record R1, the FBA block in which the HA/0 portions have been recorded need not be read out of the direct-access storage device and can be transferred to the host device at high speed.

In accordance with the present invention, the home address HA and record R0 (the leading FBA block) of each track are created internally and stored in the cache memory so that the continuity of the FBA blocks of each track can be maintained. As a result, FBA blocks can be written back to the direct-access storage device continuously over a plurality of tracks.

In accordance with the present invention, the direct-access storage device is internally provided with a table indicating the correspondence between defective tracks and alternate tracks. As a result, whether a defective track exists and the address of an alternate track can be determined by referring to the table. In a case where a track of interest is a defective track, the alternate track is obtained and processing designated by the host device can be performed directly with regard to the alternate track. This means that the alternate track can be accessed directly without accessing the defective track. The result is high-speed access.

In accordance with the present invention, a track (cylinder) used as an alternate track is set in advance. (1) A flag indicating whether a track is actually being used as the alternate track of a defective track and (2), if the track is actually being used as the alternate track of a defective track, the track address of this alternate track and the track address of the defective track are registered in the ID portion of the leading FBA block of each track. As a result, even if the content of the table is cleared by interruption of power or by a reset operation, the leading FBA block of each track can be read, thus making it possible to restore (create) the defect/alternate table DAT.

In accordance with the present invention, the correspondence between defective tracks and alternate tracks is entered into the defect/alternate table DAT when a defect/alternate processing instruction has been accepted from the host device, whereby the table is updated. As a result, the latest correspondence between defective and alternate tracks can be stored in the table at all times so that a defective track will not be accessed by mistake.

In accordance with the present invention, (1) a flag indicating whether a track is normal/defective and (2), in case of a defective track, the track address of the alternate track are stored in the ID portions of all FBA blocks. The ID portions of FBA blocks that have been developed in the cache memory are examined and, if it is determined that an FBA block has been recorded on a defective track, the head is positioned at the alternate track immediately, the necessary data is read out and developed in the memory and the newly determined correspondence between the defective and alternate tracks is entered into the table DAT. As a result, data can be read out to the cache memory from an alternate track and processed even in a case where updating of the table DAT based upon a defect/alternate processing instruction from the host device has failed. Moreover, the defect/alternate table DAT can be updated.

As many apparently widely different embodiments of the present invention can be made without departing from the spirit and scope thereof, it is to be understood that the invention is not limited to the specific embodiments thereof except as defined in the appended claims.

What is claimed is:

1. A method of controlling a disk device by a disk control unit provided between a host device, which issues input/output instructions in a variable length recording format (a CKD format), and a disk device having a recording format of a fixed length (an FBA format), for performing an emulation between the CKD format and the FBA format in a memory and accessing the disk device in fixed-length units, comprising steps of:

dividing one CKD track on a disk into a plurality of fixed-length FBA blocks;

recording only a home address HA of the CKD track and a record R0 having the CKD format in a starting FBA block; and recording each field (a COUNT field, KEY field and DATA field) of records R1 R2, . . . having the CKD format in the other FBA blocks.

2. The method according to claim 1, further comprising the steps of:

recording, in an ID portion provided at a head position of each FBA block, the numbers of records and the positions of the records included in the FBA block;

when a head positioning command is issued from the host device in the CKD format, obtaining an FBA block number from a parameter value in the head positioning command;

reading blocks from the FBA block, designated by said FBA block number to the final FBA block within the CKD track to which the first-mentioned FBA block belongs and develops these blocks in memory; and retrieving a record, which has been designated by the host device, in the memory by referring to the information recorded in said ID portion.

3. The method according to claim 2, further comprising the steps of:

registering a flag, which indicates whether write processing for writing from the host device has been interrupted or not, in the ID portion of the FBA block of every field of each record;

referring to the flag of a field which is the object of a read instruction from the host device;

reading data of said field out of memory and transferring it to the host device if the flag does not indicate that writing has been interrupted; and refraining from transferring the data of said field to the host device if the flag indicates that writing has been interrupted.

4. The method according to claim 2, wherein reading means or writing means is provided for reading records from or writing records to the memory while skipping the ID portion placed at the head of each FBA block when records spanning a plurality of FBA blocks are read from the memory or written to the memory.

5. The method according to claim 4, further comprising the steps of:

dividing a storage area in the memory storing one CKD track of data into FBA block units, assigning a block address Y to each of the divided areas and assigning internal addresses X to the interior of each divided area in order in size units of the ID portion;

designating a block address Y and an internal address X;

incrementing the address X whenever a record is written to or read from the memory in said size units; and when the address X becomes zero, incrementing the block address by one and the address X by two, thereby skipping the writing or reading of the ID portion.

6. The method according to claim 2, further comprising the steps of:

issuing a command for periodically retrieving disk status to a disk device, which does not possess a function for notifying the disk control unit of attainment of a ready state, when a transition has been made from a not-ready state to the ready state in response to introduction of power; and recognizing that the disk device has attained the ready state based upon whether the disk device has responded to said command.

7. The method according to claim 2, further comprising the steps of:

internally storing a flag indicating whether the home address HA and the record R0 have a standard format; and when an instruction for reading in the home address HA and record R0 of a prescribed block has been issued by the host device, referring to said flag and, if the flag indicates the standard format, internally creating the home address HA and record R0 and transferring them to the host device.

8. The method according to claim 7, further comprising the steps of:

internally creating the home address HA and record R0 of each track and generating a starting FBA block if the home address HA and record R0 have the standard format and, moreover, a plurality of consecutive tracks have been developed in the memory from record R1;

assuring continuity of FBA blocks in each track by recording the generated starting FBA block in the memory; and issuing an FBA block number at which writing is to start and a number N of write blocks to the disk device and writing N-number of FBA blocks in said disk device consecutively over a plurality of tracks.

9. The method according to claim 2 in a disk control unit including a control table which indicates a correspondence between defective tracks and alternate tracks, per each disk device, comprising the steps of:

setting in advance a track which is used as an alternate track of a defective track for every device;

registering, in the ID portion of the head FBA block of each said track, (1) a flag indicating whether the track is actually being used as the alternate track of a defective track and (2), if the track is actually being used as the alternate track of a defective track, the track address of said alternate track and the track address of the defective track;

creating said control table, after power has been introduced or a resetting operation performed, based upon defect/alternate information that has been registered in the ID portion of the head FBA block of each said track;

checking, by referring to said control table at reception of a processing instruction, for a prescribed track from a host device to determine whether the track is a defective track;

obtaining an alternate track from said control table in case of a defective track; and subjecting the alternate track to processing designated by the host device.

10. The method according to claim 9, wherein when a defect/alternate processing instruction has been accepted from the host device, track addresses of a defective track and alternate track designated by said instruction are entered into said control table.

11. The method according to claim 10, further comprising the steps of:

registering, in the ID portions of all FBA blocks, a flag indicating whether a track is normal/defective and, in case of a defective track, the track address of an alternate track;

recording, based upon the defect/alternate processing instruction from the host device, defect/alternate information in the ID portions of all FBA blocks on a track designated by said instruction;

examining, in response to an access request from the host device, the ID portion of an FBA block of a prescribed track read from the disk device and developed in the memory; and in a case where said FBA block has been recorded on a defective track, positioning a head on an alternate track immediately, reading FBA blocks on the alternate tracks and developing said FBA blocks in the memory.

12. The method according to claim 11, further comprising a step of entering correspondence between defective tracks and alternate tracks obtained by the examination of said ID portion.

13. A disk control unit provided between a host device which issues input/output instructions in a variable length recording format(a CKD format), and a disk device having a recording format of a fixed length (an FBA format), for performing an emulation between the CKD format and the FBA format in memory and accessing the disk device in fixed-length units, comprising steps of:

means for dividing one CKD track on a disk into a plurality of fixed-length FBA blocks;

means for recording only a home address HA of the CKD track and a record R0 having the CKD format in a starting FBA block and recording each field (a COUNT field, KEY field and DATA field) of records R1, R2, . . . having the CKD format in the other FBA blocks.

14. The disk control unit according to claim 13, further comprising:

a control table, which indicates correspondence between defective tracks and alternate tracks, per each disk device;

means for checking by referring to the control table, at reception of a processing instruction for a prescribed track from the host device, to determine whether said track is defective;

means for obtaining an alternate track from the control table in case of a defective track; and means for subjecting the alternate track to processing designated by the host device.

* * * * *

UNITED STATES PATENT AND TRADEMARK OFFICE
CERTIFICATE OF CORRECTION

PATENT NO. : 5,862,363
DATED : Januaty 19, 1999
INVENTOR(S) : Taroda et al.

It is certified that error appears in the above-identified patent and that said Letters Patent is hereby corrected as shown below:

On the Title Page

Insert -- [30] Foreign Application Priority Data Mar. 3, 1995 [JP] Japan 07-044081--

Column 2, line 13, delete "32c" and insert --32c'-- therefor

Column 2, line 14, before "cache" delete " ' , " (apostrophe; comma)

UNITED STATES PATENT AND TRADEMARK OFFICE
CERTIFICATE OF CORRECTION

PATENT NO. : 5,862,363
DATED : Januaty 19, 1999
INVENTOR(S) : Taroda et al.

It is certified that error appears in the above-identified patent and that said Letters Patent is hereby corrected as shown below:

Column 4, line 62, delete "he" and insert

--the-- therefor

Column 5, line 37, delete "umber" and insert

--number-- therefor

Column 8, line 8, delete "R b O" and insert

--RO-- therefor

Column 8, line 32, after "being" insert --a--

Column 10, line 10, delete "HA/O" and insert --HA/RO-- therefor

UNITED STATES PATENT AND TRADEMARK OFFICE
CERTIFICATE OF CORRECTION

PATENT NO. : 5,862,363
DATED : Januaty 19, 1999
INVENTOR(S) : Taroda et al.

It is certified that error appears in the above-identified patent and that said Letters Patent is hereby corrected as shown below:

Column 10, line 13, delete "HA/O" and insert --HA/RO-- therefor

Column 10, line 19, delete "HA/O" and insert --HA/RO-- therefor

Column 10, line 28, delete "HA/O" and insert --HA/RO-- therefor

Column 10, line 29, delete "HA/O" and insert --HA/RO-- therefor

Column 12, line 2, delete "HA/O" and insert

--HA/RO-- therefor

UNITED STATES PATENT AND TRADEMARK OFFICE
CERTIFICATE OF CORRECTION

PATENT NO. : 5,862,363
DATED : Januaty 19, 1999
INVENTOR(S) : Taroda et al.

It is certified that error appears in the above-identified patent and that said Letters Patent is hereby corrected as shown below:

Column 16, line 47, delete "HA/O" and insert --HA/RO-- therefor

Column 16, line 52, delete "HA/O" and insert --HA/RO-- therefor

Column 16, line 54, delete "HA/O" and insert --HA/RO-- therefor

Column 16, line 57, delete "HA/O" and insert --HA/RO-- therefor

Column 19, line 49, delete "HA/O" and insert --HA/RO-- therefor

UNITED STATES PATENT AND TRADEMARK OFFICE
CERTIFICATE OF CORRECTION

PATENT NO. : 5,862,363
DATED : Januaty 19, 1999
INVENTOR(S) : Taroda et al.

It is certified that error appears in the above-identified patent and that said Letters Patent is hereby corrected as shown below:

Column 19, line 56, delete "HA/O" and insert --HA/RO-- therefor

Column 19, line 58, delete "HA/O" and insert --HA/RO-- therefor

Column 19, line 61, delete "HA/O" and insert --HA/Ro-- therefor

Column 19, line 64, delete "HA/O" and insert --HA/RO-- therefor

Column 19, line 67, delete "HA/O" and insert --HA/RO-- therefor

UNITED STATES PATENT AND TRADEMARK OFFICE
CERTIFICATE OF CORRECTION

PATENT NO. : 5,862,363
DATED : Januaty 19, 1999
INVENTOR(S) : Taroda et al.

It is certified that error appears in the above-identified patent and that said Letters Patent is hereby corrected as shown below:

Column 20, line 1, delete "HA/O" and insert

--HA/RO-- therefor

Column 20, line 3, delete "HA/O" and insert

--HA/RO-- therefor

Column 20, line 6, delete "HA/O" and insert

--HA/Ro-- therefor

Column 20, line 8, delete "HA/O" and insert

--HA/RO-- therefor

Column 20, line 10, delete "HA/O" and insert --HA/RO-- therefor

UNITED STATES PATENT AND TRADEMARK OFFICE
CERTIFICATE OF CORRECTION

PATENT NO. : 5,862,363
DATED : Januaty 19, 1999
INVENTOR(S) : Taroda et al.

It is certified that error appears in the above-identified patent and that said Letters Patent is hereby corrected as shown below:

Column 20, line 14, delete "HA/O" and insert --HA/RO-- therefor

Column 20, line 20, delete "HA/O" and insert --HA/RO-- therefor

Column 20, line 21, delete "HA/O" and insert --HA/RO-- therefor

Column 20, line 24. delete "HA/O" and insert --HA/RO-- therefor

UNITED STATES PATENT AND TRADEMARK OFFICE
CERTIFICATE OF CORRECTION

PATENT NO. : 5,862,363
DATED : Januaty 19, 1999
INVENTOR(S) : Taroda et al.

It is certified that error appears in the above-identified patent and that said Letters Patent is hereby corrected as shown below:

Column 20, line 26, delete "HA/O" and insert --HA/RO-- therefor

Column 20, line 27, delete "HA/O" and insert --HA/RO-- therefor

Column 20, line 28, delete "HA/O" and insert --HA/RO-- therefor

Column 20, line 31, delete "HA/O" and insert --HA/RO-- therefor

Column 20, line 35, delete "HA/O" and insert --HA/RO-- therefor

UNITED STATES PATENT AND TRADEMARK OFFICE
CERTIFICATE OF CORRECTION

PATENT NO. : 5,862,363
DATED : Januaty 19, 1999
INVENTOR(S) : Taroda et al.

It is certified that error appears in the above-identified patent and that said Letters Patent is hereby corrected as shown below:

Column 20, line 48, delete "HA/O" and insert --HA/RO-- therefor

Column 20, line 50, delete "HA/O" and insert --HA/RO-- therefor

Column 20, line 59, delete "HA/O" and insert --HA/RO-- therefor

Column 20, line 61, delete "HA/O" and insert --HA/RO-- therefor

UNITED STATES PATENT AND TRADEMARK OFFICE
CERTIFICATE OF CORRECTION

PATENT NO. : 5,862,363
DATED : Januaty 19, 1999
INVENTOR(S) : Taroda et al.

It is certified that error appears in the above-identified patent and that said Letters Patent is hereby corrected as shown below:

Column 22, line 34, delete "racks" and insert --tracks-- therefor

Column 23, line 8, delete "HA/O" and insert --HA/RO-- therefor

Column 23, line 47, delete "HA/O" and insert --HA/RO-- therefor

Column 23, line 49, delete "HA/O" and insert --HA/RO-- therefor

Column 23, line 52, delete "HA/O" and insert --HA/RO-- therefor

Signed and Sealed this

Twenty-first Day of September, 1999

Attest:

Q. TODD DICKINSON

*Attesting Officer*    *Acting Commissioner of Patents and Trademarks*